US012046400B1

(12) United States Patent
Dudt et al.

(10) Patent No.: US 12,046,400 B1
(45) Date of Patent: Jul. 23, 2024

(54) GRANULAR MAGNETICALLY STRENGTHENED STRUCTURES

(71) Applicants: Philip J. Dudt, North Bethesda, MD (US); H. John Nasrin, North Potomac, MD (US); Hiren D. Balsara, Catonsville, MD (US)

(72) Inventors: Philip J. Dudt, North Bethesda, MD (US); H. John Nasrin, North Potomac, MD (US); Hiren D. Balsara, Catonsville, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 285 days.

(21) Appl. No.: 17/354,822

(22) Filed: Jun. 22, 2021

Related U.S. Application Data

(60) Provisional application No. 63/043,436, filed on Jun. 24, 2020.

(51) Int. Cl.
*H01F 1/44* (2006.01)
*F16F 1/36* (2006.01)

(52) U.S. Cl.
CPC .............. *H01F 1/447* (2013.01); *F16F 1/361* (2013.01); *B63B 2231/30* (2013.01); *B63B 2241/06* (2013.01)

(58) Field of Classification Search
CPC ...... H01F 1/447; F16F 1/361; B63B 2231/30; B63B 2241/06

(Continued)

(56) References Cited

U.S. PATENT DOCUMENTS 5,609,353 A * 3/1997 Watson ................. F16F 1/3615
188/267
5,816,587 A * 10/1998 Stewart ................. F16F 1/361
280/124.105

(Continued)

OTHER PUBLICATIONS

U.S. Appl. No. 63/043,436, filed Jun. 24, 2020, Navy case No. 108,284, entitled "Granular Dynamically Strengthened Structures," inventors Philip J. Dudt, H. John Nasrin, and Hiren D. Balsara.

(Continued)

*Primary Examiner* — Robert A. Siconolfi
*Assistant Examiner* — San M Aung
(74) *Attorney, Agent, or Firm* — Howard Kaiser

(57) ABSTRACT

Exemplary inventive practice provides a structure that is attributed with superior resistance to loading. For example, an inventive structure includes two coaxial axisymmetric (e.g., cylindrical) shells and a granulation-filled matrix material occupying the peripheral space between the shells. According to some inventive embodiments, the granulation-filled matrix material has a loading-responsive matrix (e.g., shear-thickening fluid or highly rate-sensitive polymer) and granules dispersed therein. When the inventive structure encounters pressure loading at its exterior shell, the consistency of the loading-responsive matrix becomes thicker or firmer and thereby promotes, among the granules, interactive mechanisms (e.g., friction and/or arching) that reinforce the granulation-filled matrix material. According to some inventive embodiments, the granulation-filled matrix material has a magnetic-field-responsive matrix and magnetizable granules dispersed therein, and is magnetically fortified via application of a magnetic field (e.g., continuously applied where the matrix is magnetorheological fluid, or temporarily applied where the matrix is rheological fluid containing diamagnetic particles).

23 Claims, 18 Drawing Sheets

(58) Field of Classification Search
USPC .................................................. 267/140.14
See application file for complete search history.

(56) References Cited

U.S. PATENT DOCUMENTS

| | | | | |
|---|---|---|---|---|
| 5,878,997 | A * | 3/1999 | Miesner | F16F 9/535 |
| | | | | 188/322.22 |
| 6,528,110 | B2 * | 3/2003 | Szalony | C10M 171/001 |
| | | | | 427/457 |
| 7,114,764 | B1 | 10/2006 | Barsoum et al. | |
| 7,300,893 | B2 | 11/2007 | Barsoum et al. | |
| 7,584,685 | B2 | 9/2009 | Crist | |
| 7,794,808 | B2 | 9/2010 | Dudt et al. | |
| 7,938,053 | B1 | 5/2011 | Dudt | |
| 7,946,211 | B1 | 5/2011 | Winchester et al. | |
| 8,580,387 | B1 | 11/2013 | Fedderly et al. | |
| 9,752,639 | B2 * | 9/2017 | Beck | F16F 9/006 |
| 9,869,533 | B2 | 1/2018 | Vanarsdalen et al. | |
| 11,560,685 | B1 | 1/2023 | Dudt et al. | |
| 11,585,639 | B1 | 2/2023 | Pinsky et al. | |
| 2004/0105980 | A1 * | 6/2004 | Sudarshan | H01F 1/447 |
| | | | | 428/404 |
| 2005/0011710 | A1 * | 1/2005 | Hitchcock | F16F 1/361 |
| | | | | 188/267.2 |
| 2006/0051535 | A1 * | 3/2006 | Arney | A61M 25/0127 |
| | | | | 428/34.1 |
| 2010/0221521 | A1 * | 9/2010 | Wagner | C09K 23/00 |
| | | | | 428/323 |
| 2011/0062371 | A1 * | 3/2011 | Marur | H01F 1/36 |
| | | | | 252/62.51 R |
| 2012/0186003 | A1 * | 7/2012 | Heger | A41D 13/015 |
| | | | | 188/267.2 |
| 2018/0112710 | A1 * | 4/2018 | Considine | F16C 27/04 |
| 2018/0238413 | A1 * | 8/2018 | Brown | F16F 9/3484 |

OTHER PUBLICATIONS

U.S. Appl. No. 17/354,795, filed Jun. 22, 2021, Navy case No. 108,284, entitled "Granular Dynamically Strengthened Structures," inventors Philip J. Dudt, H. John Nasrin, and Hiren D. Balsara.

U.S. Appl. No. 17/689,112, filed Mar. 8, 2022, Navy case No. 108,103, entitled "Implosion-Resistant Lightweight Membrane Shell Devices for High-Pressure Applications," inventor Philip J. Dudt.

U.S. Appl. No. 16/529,432, filed Aug. 1, 2019, Navy case No. 103,820, entitled "Personal Armor Resistant to Sharp or Pointed Weaponry," joint inventors James Pinsky, Philip J. Dudt, and Devin P. Murphy.

U.S. Appl. No. 16/529,477, filed Aug. 1, 2019, Navy case No. 110,525, entitled "Personal Armor Resistant to Pointed or Sharp Weaponry," joint inventors James Pinsky, Philip J. Dudt, and Devin P. Murphy.

Notice of Allowance and Fee(s) Due and accompanying documents (21 pages total) including Notice of Allowability, Notice of References Cited, and Search History, U.S. Appl. No. 17/354,795, filed Jun. 22, 2021, Navy case No. 108,284, entitled "Granular Dynamically Strengthened Structures," inventors Philip J. Dudt, H. John Nasrin, and Hiren D. Balsara.

Information Disclosure Statement form, filed Aug. 30, 2022 (5 pages), U.S. Appl. No. 17/354,795, filed Jun. 22, 2021, Navy case No. 108,284, entitled "Granular Dynamically Strengthened Structures," inventors Philip J. Dudt, H. John Nasrin, and Hiren D. Balsara.

Supplemental Notice of Allowability and accompanying papers, mail-dated Nov. 13, 2022 (12 pages total), U.S. Appl. No. 17/354,795, filed Jun. 22, 2021, Navy case No. 108,284, entitled "Granular Dynamically Strengthened Structures," inventors Philip J. Dudt, H. John Nasrin, and Hiren D. Balsara, now U.S. Pat. No. 11,560,685.

* cited by examiner

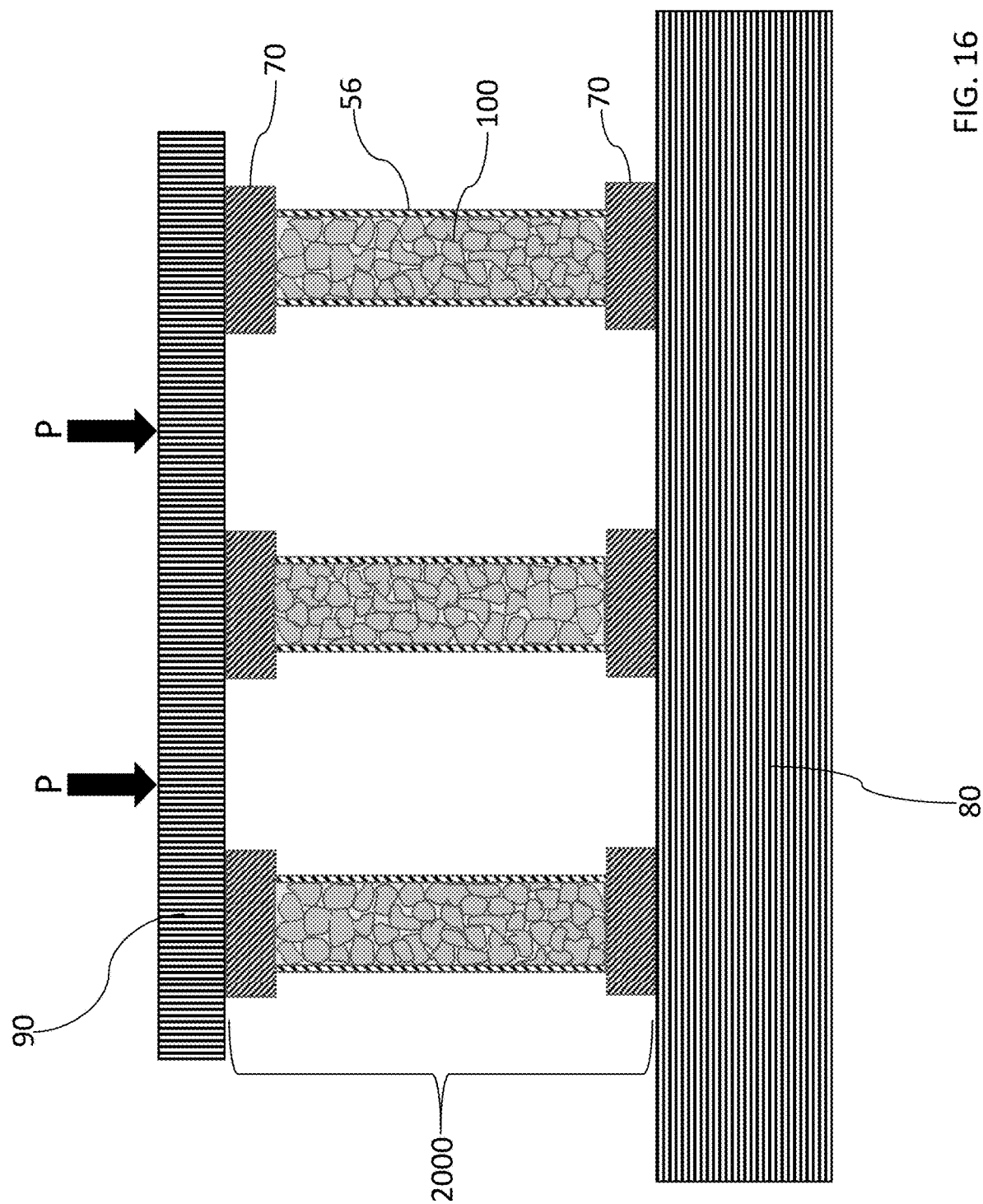

| Dynamically Strengthening Material | | Other Characteristics | | |
|---|---|---|---|---|
| Matrix Material | Filler Material | Exposed To Magnetic Field? | Cylindrical Shells Magnetized? | Strengthening Mechanisms |
| Shear-Thickening Fluid (e.g., Liquid Armor) | Non-Magnetizable Granules | No | No | thickening of dynamically strengthening material<br><br>inter-friction and arching forces between granules |
| | Magnetizable Granules | Yes | No | thickening of dynamically strengthening material<br><br>inter-friction and arching forces between granules |
| | | | Yes | magnetic attraction between, and alignment of, granules |
| Magnetorheological Fluid | Magnetizable Granules | Yes | No | thickening of dynamically strengthening material<br><br>inter-friction and arching forces between granules |
| | | | Yes | magnetic attraction between, and alignment of, granules |
| Anti-Magnetic Rheological Fluid | Magnetizable Granules | Yes | No | thickening of dynamically strengthening material<br><br>inter-friction and arching forces between granules |
| | | | Yes | magnetic attraction between, and alignment of, granules<br><br>magnetic repelling by dielectric particles enhances alignment of granules |
| Highly Rate-Sensitive Polymer (e.g., Polyurea) | Non-Magnetizable Granules | No | No | thickening of dynamically strengthening material<br><br>inter-friction and arching forces between granules |
| | Magnetizable Granules | Yes | No | thickening of dynamically strengthening material<br><br>inter-friction and arching forces between granules |
| | | | Yes | magnetic attraction between, and alignment of, granules |

FIG. 17

GRANULAR MAGNETICALLY STRENGTHENED STRUCTURES

CROSS-REFERENCE TO RELATED APPLICATIONS

This patent application claims the benefit of U.S. provisional patent application No. 63/043,436, filed 24 Jun. 2020, hereby incorporated herein by reference, entitled "Granular Dynamically Strengthened Structures," inventors Philip J. Dudt, H. John Nasrin, and Hiren D. Balsara.

This patent application is related to United States non-provisional patent application, concurrently filed herewith, hereby incorporated herein by reference, entitled "Granular Dynamically Strengthened Structures," inventors Philip J. Dudt, H. John Nasrin, and Hiren D. Balsara.

STATEMENT OF GOVERNMENT INTEREST

The inventorship of the invention described herein includes at least one person who made the invention in performance of his or her official duties as an employee of the Department of the Navy. The invention may be manufactured, used, and licensed by or for the Government of the United States of America for governmental purposes without payment of any royalties thereon or therefor. The Government of the United States of America has ownership rights in the invention.

BACKGROUND OF THE INVENTION

The present invention relates to structures characterized by resistance to pressure loading, more particularly to cylindrical structures suitable for marine use involving resistance to hydrostatic pressure loading.

Structures used for pressure-loaded applications have been constructed in various ways. For instance, according to a conventional practice, a cylindrical structure designed for exposure to hydrostatic pressure is typically stiffened by circumferential frames. Many conventional hydrostatically-loaded shells, such as constituents of some marine vessels, are constructed as ring-stiffened cylinders. For example, a ring-stiffened cylindrical structure may be made to include two concentric cylinders (e.g., a diametrically larger cylinder and a diametrically smaller cylinder) and plural ring-stiffeners placed (e.g., welded) therebetween. The ring stiffeners may be designed to provide strength primarily where stresses are the highest, such as in the circumferential direction; theoretically, the circumferential stresses on a cylindrical body are twice those in the longitudinal direction.

According to a different conventional practice, a cylindrical shell is provided with a sandwich construction that includes a core located between the two concentric walls of the cylindrical shell, wherein the core between the two concentric cylinders is either a fine truss structure or a foamed plastic material. Sandwich stiffening is thus afforded through implementation of two concentric shell walls that are connected to each other by a truss core or a foam material. The sandwich configuration increases the inertia of the shell against buckling. As compared with a conventional ring-stiffened configuration, a conventional sandwich-stiffened configuration may provide more efficient distribution of strength in the circumferential and longitudinal directions.

SUMMARY OF THE INVENTION

In view of the foregoing, an object of the present invention is to provide better structures, and better apparatuses and methodologies pertaining thereto, for resisting (e.g., withstanding, enduring, or tolerating) loads such as pressure loads or structural loads.

Another object of the present invention is to provide better cylindrical structures for resisting conditions involving high pressure loading.

In accordance with exemplary practice of the present invention, an inventive structure comprises an axisymmetric body and a granularly filled matrix material. The axisymmetric body is characterized by an interior space. The granularly filled matrix material is confined in the interior space and includes a matrix and a plurality of granules dispersed in the matrix. The matrix is thickened or hardened in response to subjection of the inventive structure to loading. The structure is dynamically strengthened in association with the thickening or hardening of the matrix. The matrix is a shear-thickening fluid or a strain-rate-sensitivity-hardening elastomer. If the matrix is a shear-thickening fluid, then the matrix is thickened in response to the subjection of the inventive structure to the loading. If the matrix is a strain-rate-sensitivity-hardening elastomer, then the matrix is hardened in response to the subjection of the structure to the loading.

In accordance with some embodiments of the present invention, an inventive structure comprises an axisymmetric body and a granularly filled matrix material. The axisymmetric body is characterized by an interior space. The granularly filled matrix material is confined in the interior space and includes a magnetorheological fluid and a plurality of granules dispersed in the magnetorheological fluid. At least some of the granules are paramagnetic. While a magnetic field is applied to the granularly filled matrix material the magnetorheological fluid thickens, at least some of the granules frictionally interact, at least some of the granules configuratively interact, and at least some of the granules are magnetically attracted to each other. The applied magnetic field thereby strengthens the structure as compared with what the strength of the structure would be in the absence of the applied magnetic field.

In accordance with some embodiments of the present invention, an inventive structure comprises an axisymmetric body and a granularly filled matrix material. The axisymmetric body is characterized by an interior space. The granularly filled matrix material is confined in the interior space and includes an anti-magnetic rheological fluid and a plurality of granules dispersed in the anti-magnetic rheological fluid. The anti-magnetic rheological fluid includes a carrier fluid and a plurality of particles contained in the carrier fluid. At least some of the granules are ferromagnetic, and at least some of the particles are diamagnetic. The structure has been strengthened by a temporary application of a magnetic field. The strengthening of the structure is characterized by an interlocking among at least some of the granules. The interlocking is associated with a magnetic attraction by the magnetic field of at least some of the granules, and a magnetic repelling by the magnetic field of at least some of the particles.

BRIEF DESCRIPTION OF THE DRAWINGS

The present invention will now be described, by way of example, with reference to the accompanying drawings, wherein like numbers indicate same or similar parts or components, and wherein:

FIG. 7 and FIG. 8 differ from each other in certain details of the inventive structure being shown.

FIG. 10 illustrates, by way of example, an exertion of pressure loading with respect to the inventive structure shown in FIG. 9. FIG. 11 illustrates an example, in accordance with the present invention, of an application of a magnetic field with respect to the inventive structure shown in FIG. 9.

FIG. 13 illustrates an example, in accordance with the present invention, of an application of a magnetic field with respect to the inventive structure shown in FIG. 12.

FIG. 16 is an elevation view, partially in cross-section, of an inventive embodiment that includes implementation of three inventive structures such as the inventive structure shown in FIGS. 14 and 15.

FIG. 17 is a table describing examples of various modes of practice of the present invention.

DESCRIPTION OF EXEMPLARY EMBODIMENTS OF THE INVENTION

Figure 1:
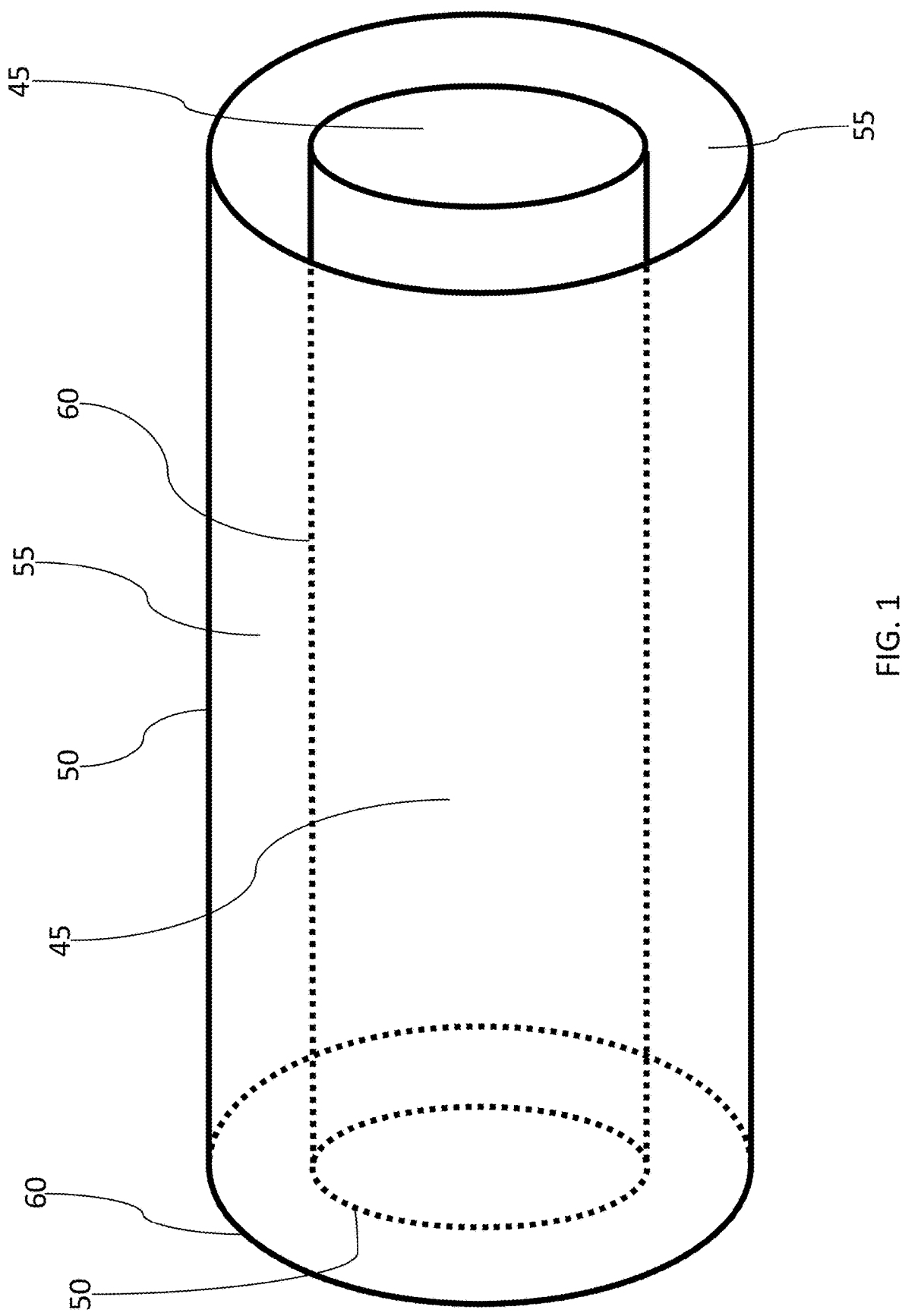
FIG. 1 geometrically illustrates two cylinders, viz., an inner cylinder and an outer cylinder, that are coaxially situated.
Figure 2:
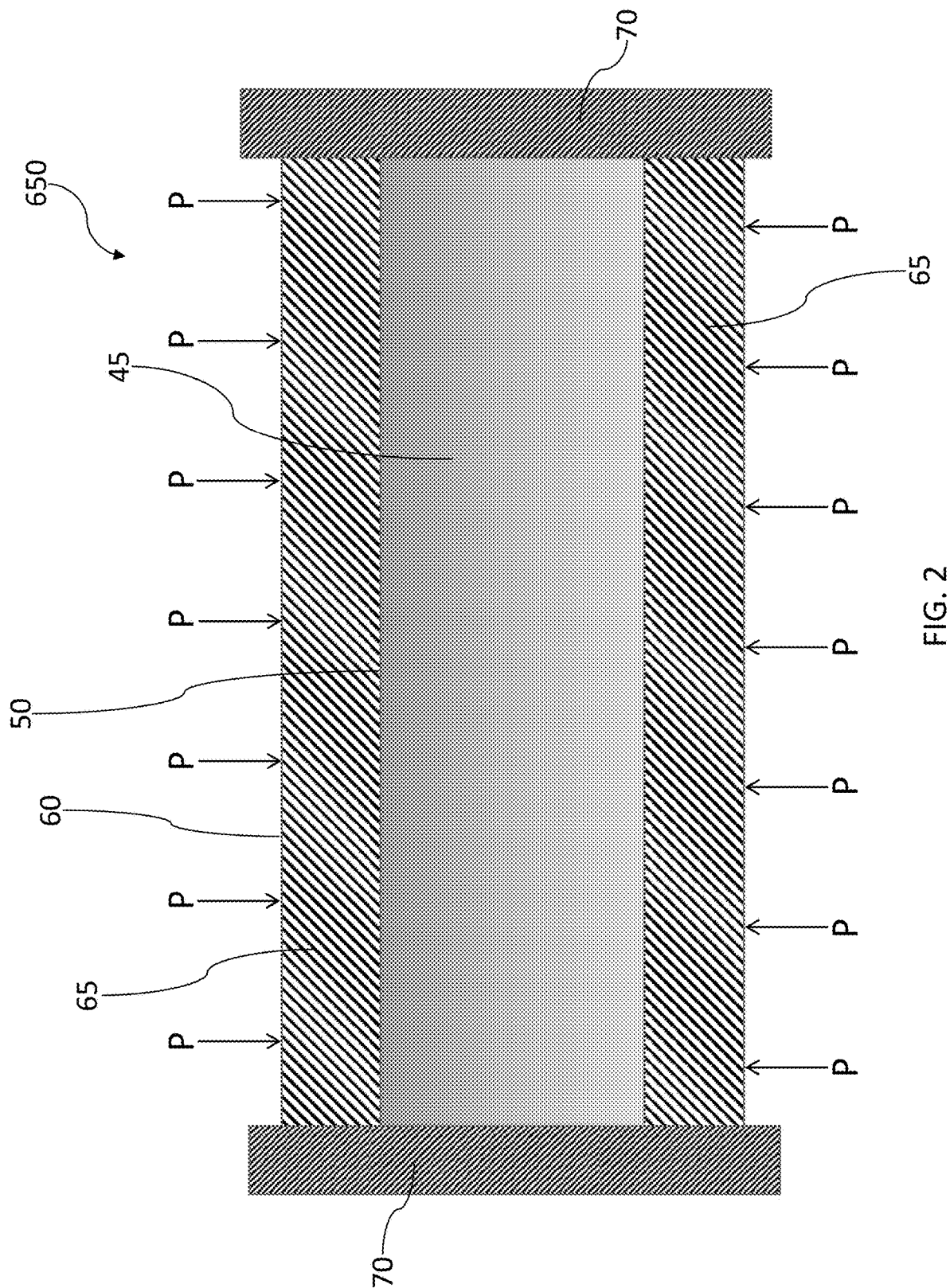
FIG. 2 is a cross-sectional side view of an example of a structure having two coaxial cylindrical walls and a sandwich core material therebetween.
Figure 5:
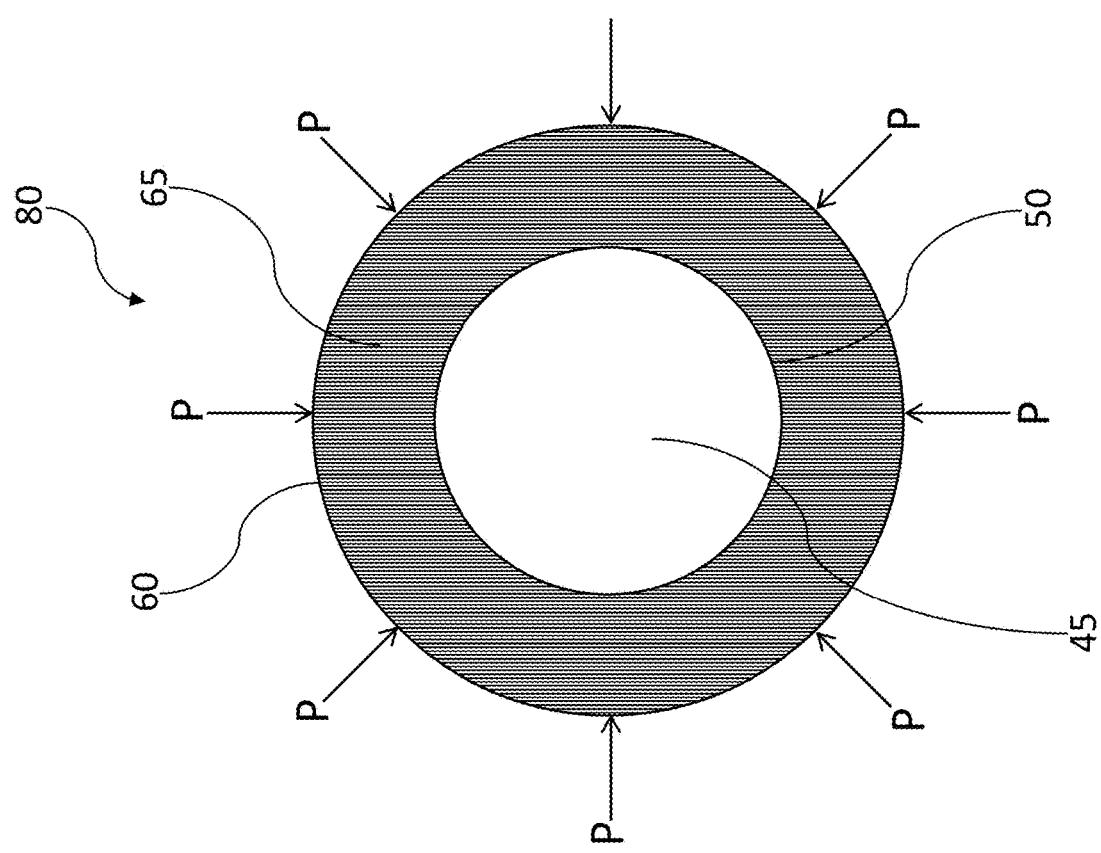
FIG. 5 is a cross-sectional end view of the structure shown in FIG. 2.

Referring now to FIG. 1, a general notion exists that it may be propitious to concentrically combine two cylinders, such as an inner cylindrical shell wall 50 and an outer cylindrical shell wall 60, in order to provide a strong (e.g., pressure-resistant) cylindrical structure. As shown in FIGS. 2 and 5, a conventional approach interposes a truss core or foam material 65 as a sandwich core material between the inner shell wall 50 and the outer shell wall 60 in a double-walled construction, providing an overall cylindrical structure 650 with two end-closures 70.

Figure 3:
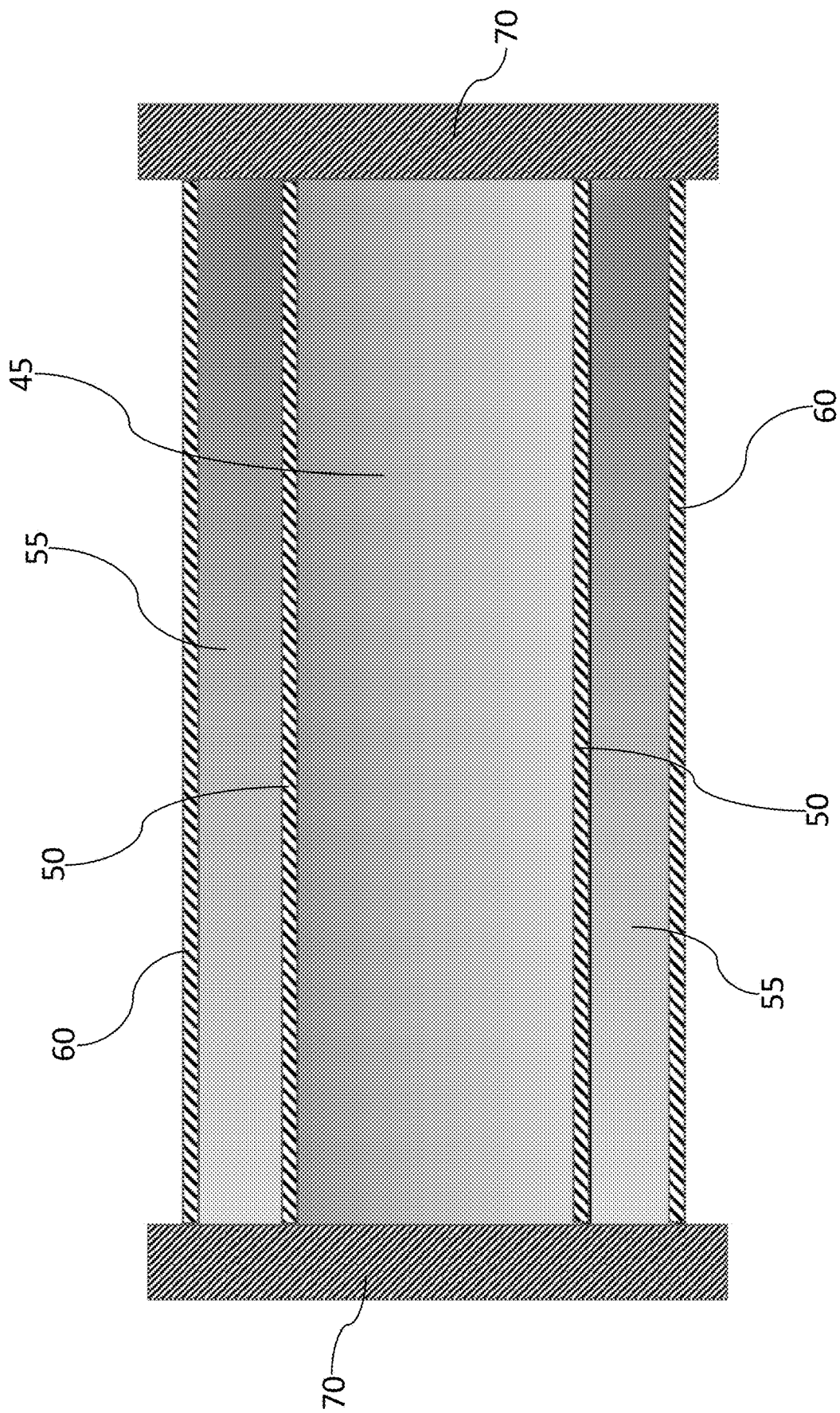
FIG. 3 is a cross-sectional side view of an example of a structure having two coaxial cylindrical walls and a void therebetween.
Figure 4:
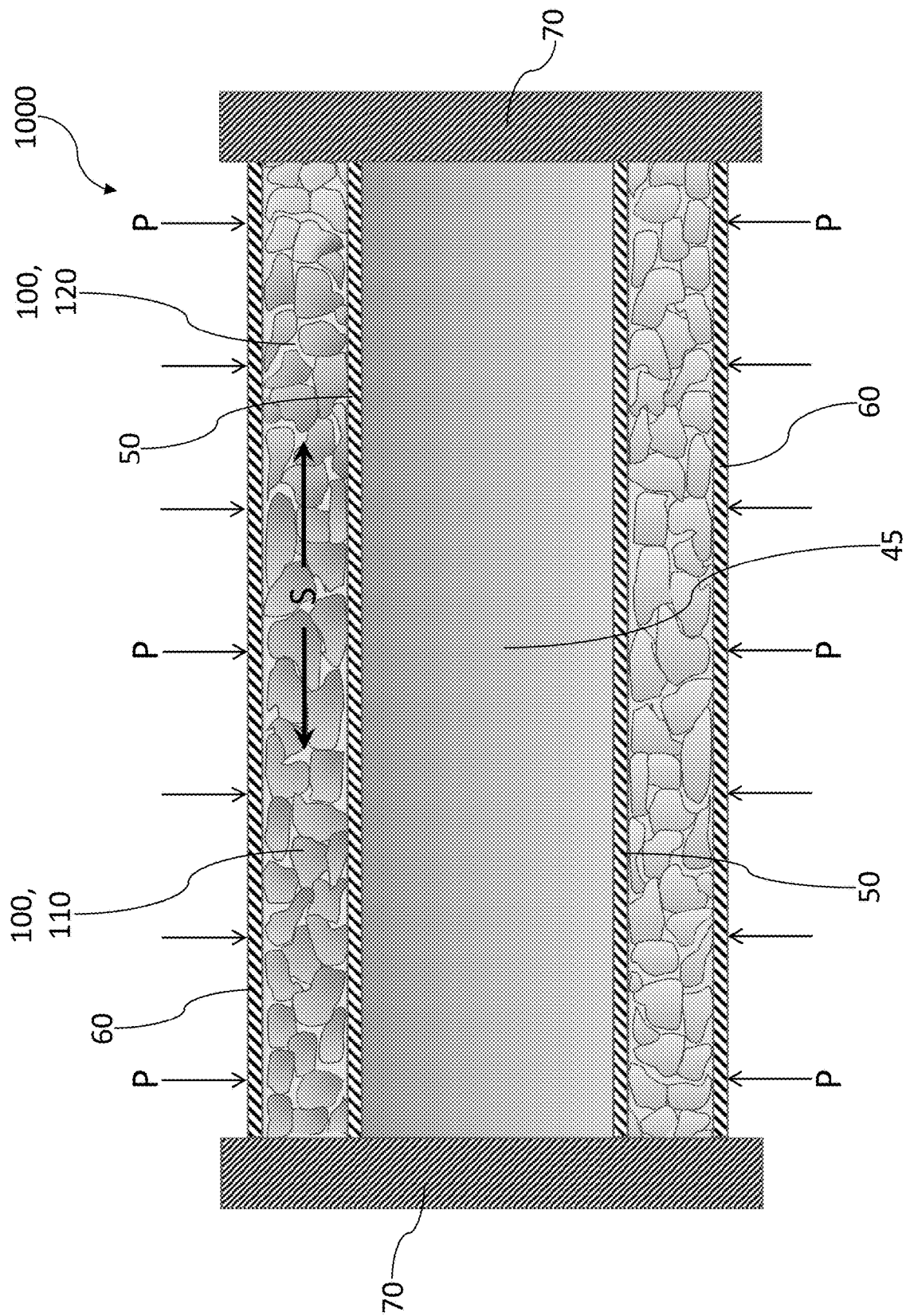
FIG. 4 is a cross-sectional side view, similar to the view of FIG. 3, of an embodiment of a structure in accordance with the present invention. The inventive structure shown in FIG. 4 has two coaxial cylindrical walls and a dynamically strengthening granulation-filled matrix material therebetween. The inventive granulation-filled matrix material includes a matrix and a number of granules dispersed in the matrix.
Figure 6:
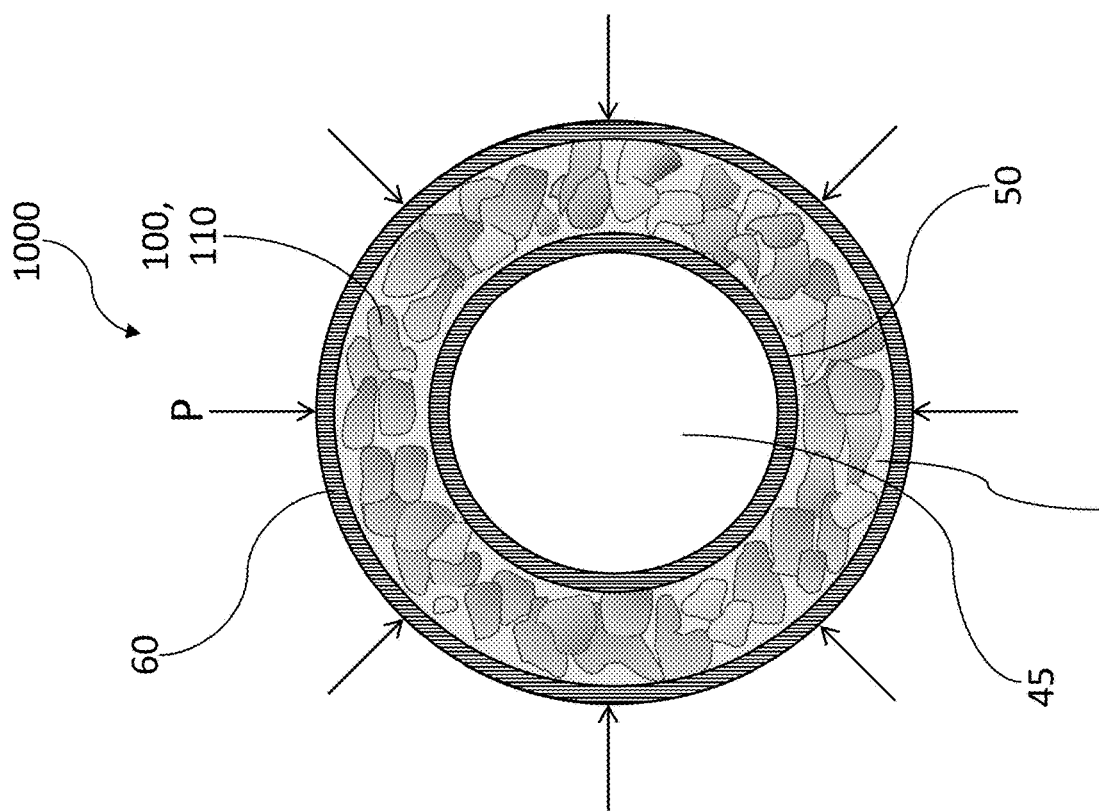
FIG. 6 is a cross-sectional end view of the inventive structure shown in FIG. 4.

With reference to FIGS. 3 and 4, a void (space) 55 is located between inner cylindrical shell wall 50 and outer cylindrical shell wall 50. Exemplary practice of the present invention uniquely avails itself of the void 55 by occupying void 55 with a dynamically strengthening material 100. Inventively interposed between cylindrical shell walls 50 and 60 is a novel kind of cylindrical sandwich core material, viz., dynamically strengthening granulation-filled matrix material 100. Two end-closures 70 are positioned at opposite axial-longitudinal ends. Exemplary inventive practice thus provides an integral cylindrical structure 1000 having superior qualities in terms of strength, such as resistance to or endurance of hydrostatic pressure P.

Reference being made to FIG. 4 and FIGS. 6 through 17, the present invention's dynamically strengthening material 100 includes plural (e.g., multiple) granules 110 and a matrix material 120. As tabularly presented in FIG. 17, the present invention may be embodied to include any of four kinds of matrix material 120, namely: (i) a shear-thickening fluid (e.g., liquid armor); (ii) a magnetorheological fluid; (iii) an anti-magnetic rheological fluid; or (iv) a highly rate-sensitive polymer (e.g., polyurea). Depending on the inventive embodiment, the granular material 110 may be magnetizable or non-magnetizable.

Each kind of fluidic matrix material for the granules—whether shear-thickening fluid, or magnetorheological fluid, or anti-magnetic rheological fluid—is characterized by a carrier fluid and numerous microparticles or nanoparticles dispersed in the carrier fluid. According to multifarious embodiments of the present invention, the sizes and shapes of the particles in the carrier fluid are not limited. For instance, microparticles may have irregular shapes, such as "hooks" that enable the microparticles to latch onto one another. Inventive practice admits of diverse possibilities with respect to the physical characteristics of the granules and of the nanoparticles/microparticles contained in the matrix material, whether it be shear-thickening fluid or magnetorheological fluid or anti-magnetic rheological fluid.

Figure 8:
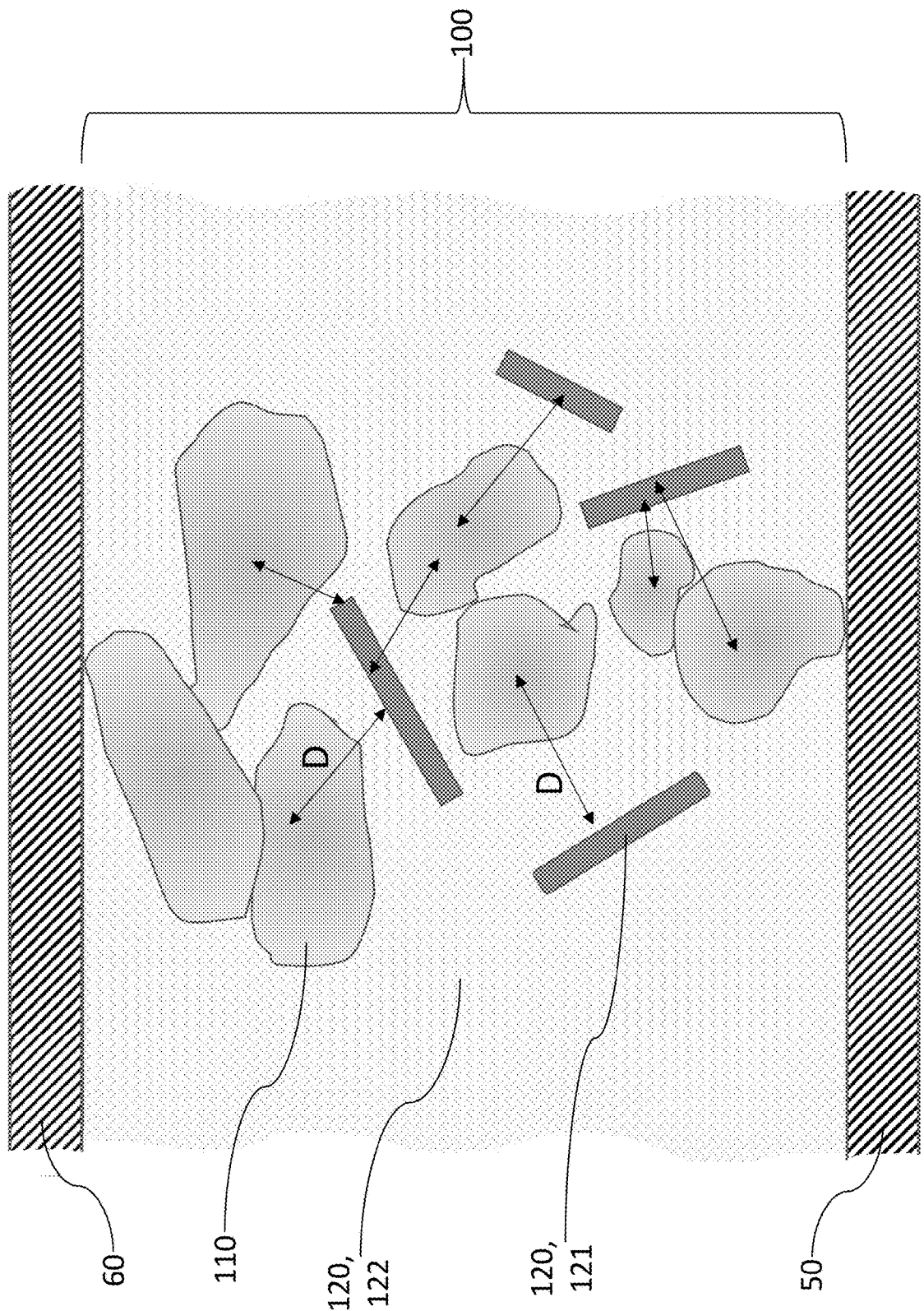
Figure 9:
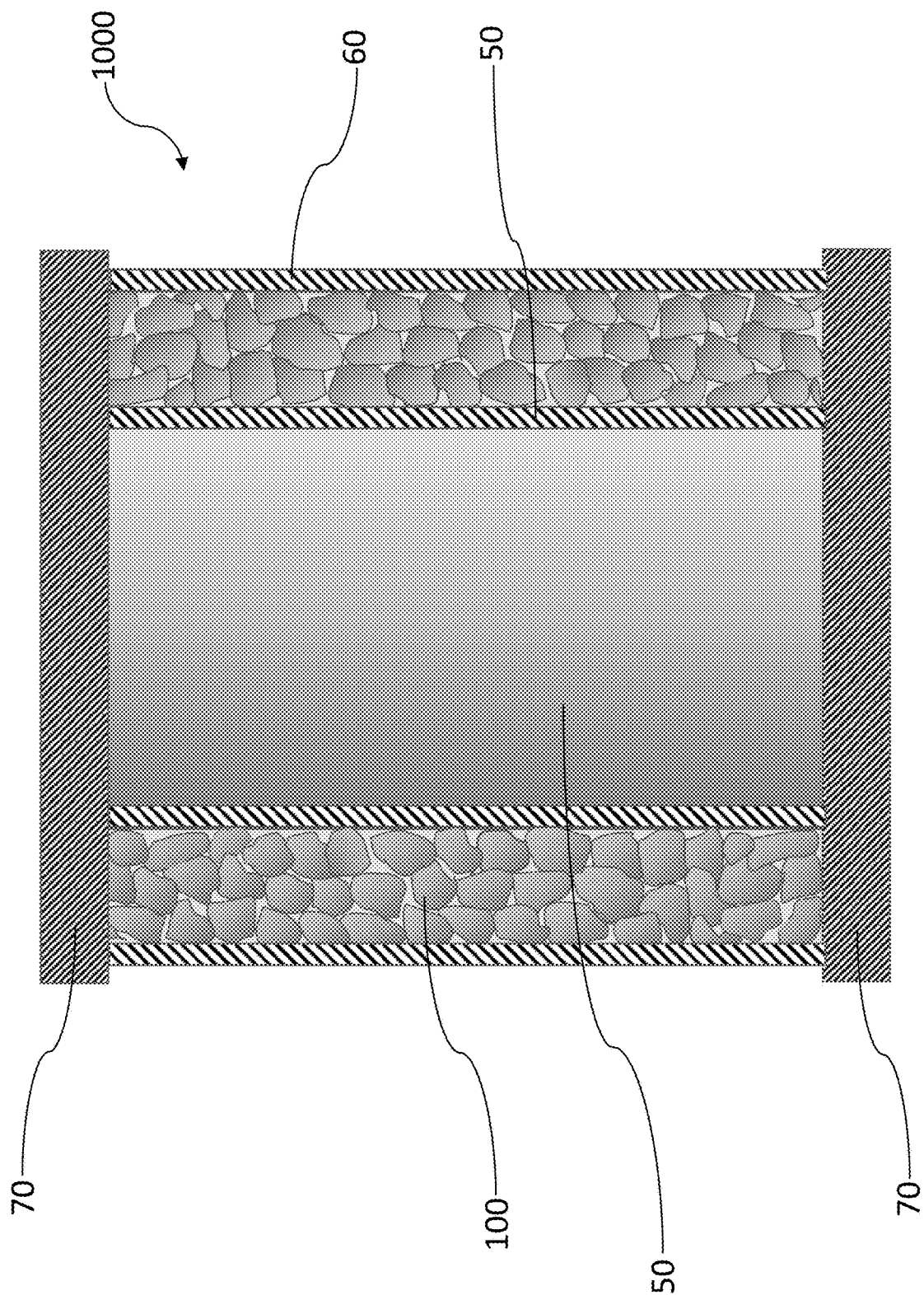
FIGS. 9 through 11 are each a cross-sectional side view, similar to the view of FIG. 4, of another embodiment of a structure in accordance with the present invention.
Figure 10:
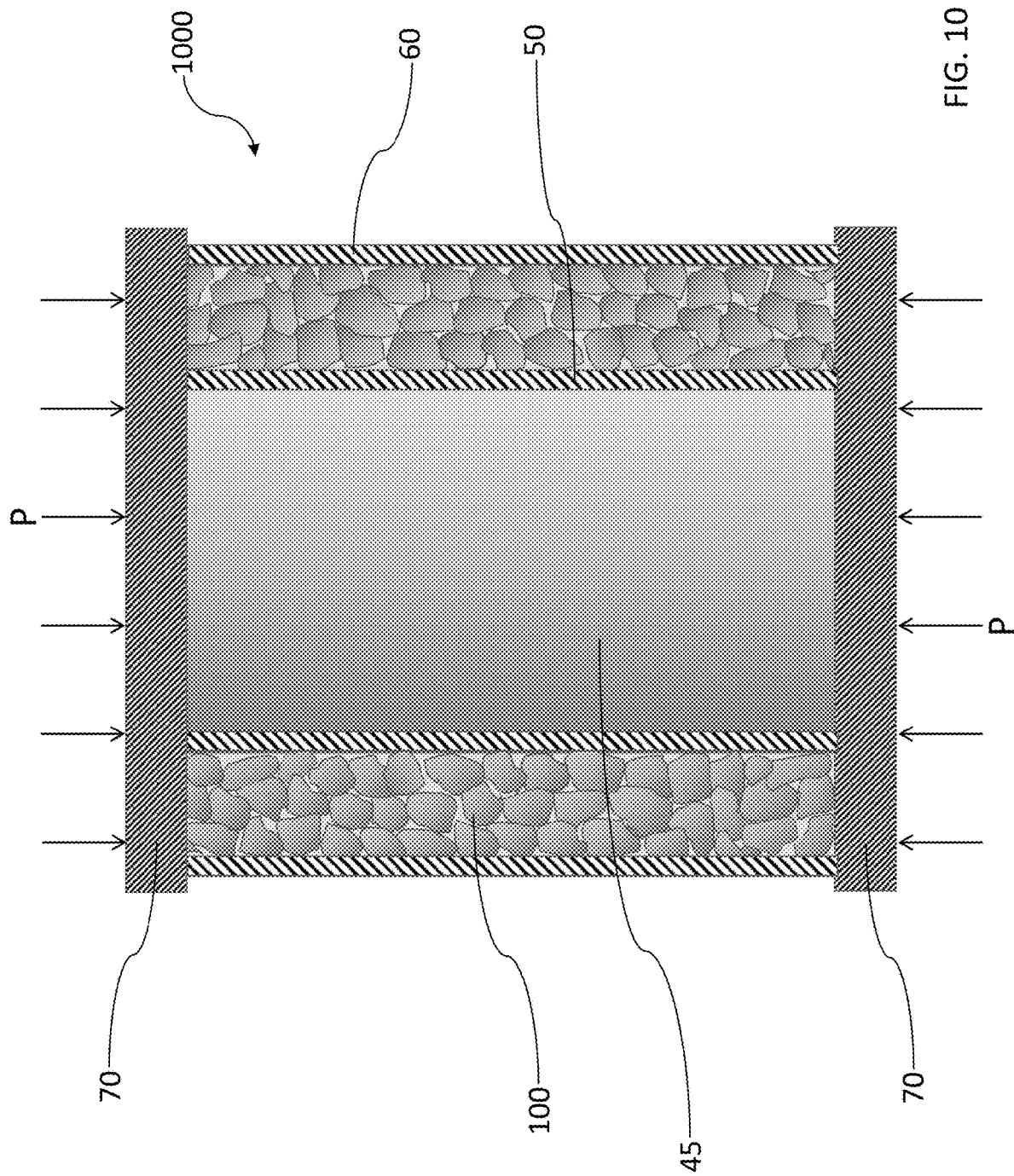

FIG. 8 depicts a matrix material 120 that, depending on the inventive embodiment, represents either a shear-thickening fluid, or a magnetorheological fluid matrix material, or an anti-magnetic rheological fluid matrix material. As depicted in FIG. 8, the present invention's dynamically strengthening material 100 includes granules 110 and a matrix 120 that includes tiny particles (e.g., microparticles or nanoparticles) 121 and a liquid medium (e.g., an oil-based carrier fluid) 122. According to exemplary inventive practice, in the case of a shear-thickening fluid 120, the tiny particles 121 (e.g., silica) are neither magnetizable (e.g., ferromagnetic) nor diamagnetic. In the case of a magnetorheological fluid 120, the tiny particles 121 (e.g., ferrite) are magnetizable (e.g., ferromagnetic). In the case of an anti-magnetic rheological fluid 120, the tiny particles 121 (e.g., pyrolytic graphite) are diamagnetic.

The term "paramagnetic" is used herein to refer to a material that is at least slightly attracted by a magnetic field. The term "ferromagnetic" is used herein to refer to a paramagnetic material that is strongly attracted by a magnetic field. Generally, a ferromagnetic material retains magnetic properties upon removal of an external magnetic field; a paramagnetic material that is not ferromagnetic does not retain magnetic properties upon removal of an external magnetic field. The term "diamagnetic" is used herein to refer to a materials that is at least slightly repelled by a magnetic field. Generally, a diamagnetic material does not retain magnetic properties upon removal of an external magnetic field. The term "magnetizable" is used herein to refer to a material that is capable of being magnetized or of having magnetic properties induced therein. With regard to the vast majority of inventive embodiments that include magnetizable granules, the magnetizable granules are preferably ferromagnetic, i.e., granules that are made of a ferromagnetic material such as iron or ferrite ($Fe_3O_4$).

Exemplary practice of the present invention provides a cylindrical structure, and a method for making same, that is buckling-resistant when subjected to high pressure loading. Exemplary inventive practice features, inter alia, a granule-filled matrix—i.e., a novel combination of suitable granules with a suitable matrix so as to achieve great effectiveness for many structural applications. An exemplary inventive cylindrical structural device includes low weight-to-displacement membrane shells having superior strength, and is characterized by high resistance to sympathetic implosion in a high pressure environment. In accordance with exemplary practice of the present invention, granular packing with a matrix material (a shear-thickening fluid, or a magnetorheological fluid, or an anti-magnetic rheological fluid, or a highly rate-sensitive polymer) develops a passive "smart structure" that dynamically strengthens when under dynamic load.

According to many inventive embodiments, the granules are situated in the peripheral space between the concentric cylinders, and this is followed by introduction therein of the matrix material so that the granules are immersed in the matrix material. According to some inventive embodiments, situation of the matrix material in the space is followed by introduction of the granules into the matrix material. According to some inventive embodiments, the granules and the matrix material are mixed together, and then the mixture is introduced into the space.

Exemplary inventive practice improves upon a conventional core sandwich configuration having a truss core or a core material made of foam. Instead, the present invention uniquely provides an inventive core sandwich configuration having a core material made of a granule-filled matrix material, such as a matrix and granules dispersed (e.g., packed) in the matrix. The present invention is frequently embodied to provide an inventive construction characterized by a rather short L/D (length-to-diameter) ratio, and/or fewer (e.g., two shell walls), thereby providing additional interactions in the longitudinal direction and at the ends. According to some inventive embodiments, inventive structures having shortened cylindrical shells may be joined at the axial-longitudinal ends to provide an inventive pressurized structure of much longer length.

Figure 7:
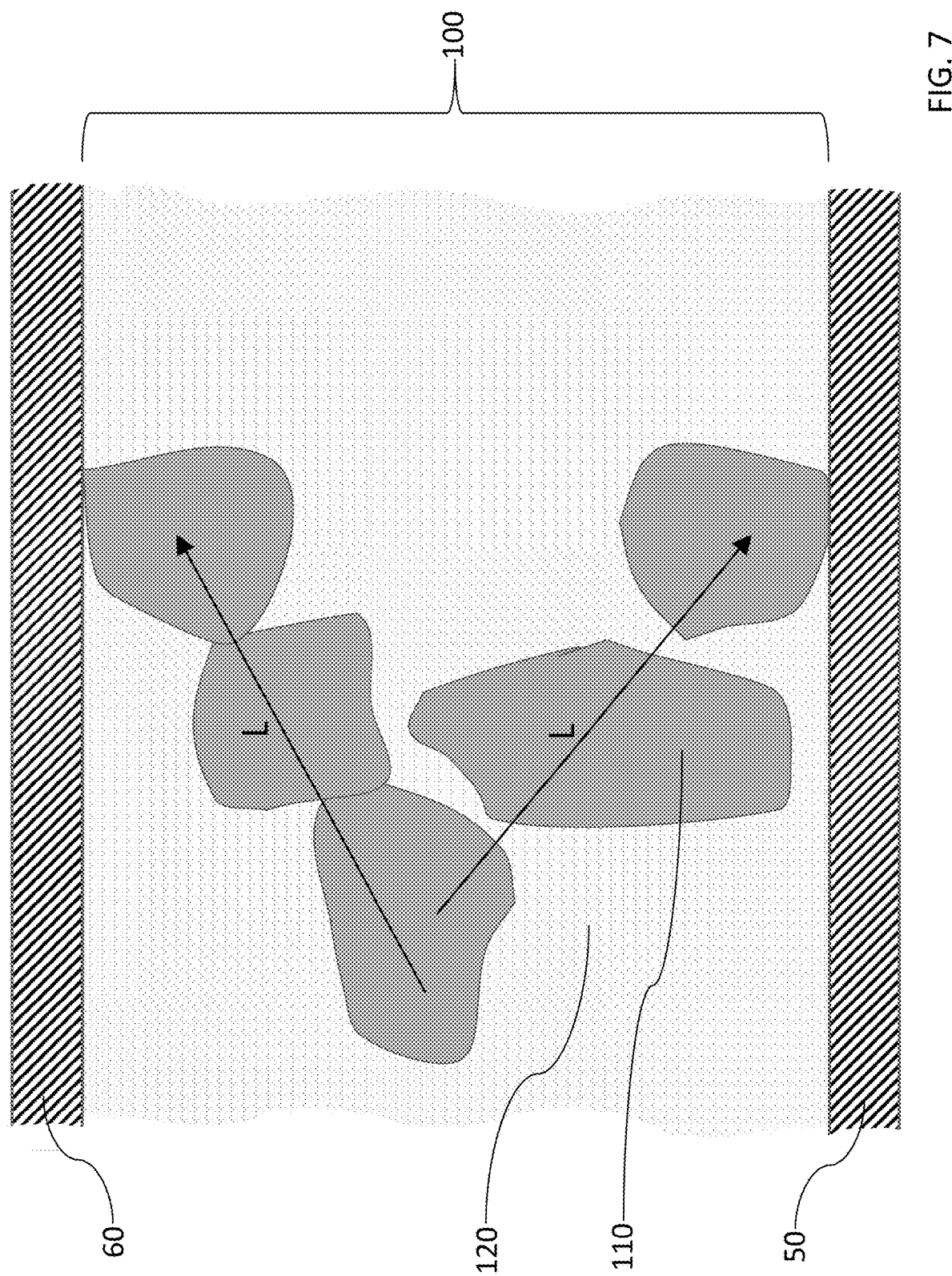
FIG. 7 and FIG. 8 are each a partial and enlarged rendition of the view of the inventive structure shown in FIG. 4.

With reference to FIG. 7, according to some embodiments of the present invention, the granules 110 are immersed in a shear-thickening (e.g., "liquid armor") fluid 120, such as a colloidal mixture of silica nanoparticles in polyethylene glycol. According to more usual inventive practice of a matrix material that is shear-thickening fluid, the granules dispersed therein are non-magnetizable; however, some such inventive embodiments may provide for magnetizable granules. Examples of non-magnetizable granules suitable for inventive practice include: borosilicate glass spheres (e.g., having a diameter ranging from 2 mm to 4 mm); soda lime glass spheres (e.g., having a diameter ranging from 2 mm to 4 mm); pumice; globules.

It is to be understood that, according to exemplary inventive practice, the granules are not limited in either size or shape. Neither magnetizable nor non-magnetizable granules are limited in size and shape. For instance, the aforementioned 2 mm to 4 mm diameter range of the granules reflects restrictions associated with testing that was conducted by the present inventors. The magnetizable granules are also not limited in size and shape. Whether magnetizable or non-magnetizable, the granules can be spherical (have uniform diameter) or non-spherical, regular or irregular. For example, magnetizable granules can be metallic spheres, grounded metal, or chipped metal, such as in the nature of a metallic mulch having finely chopped pieces with non-uniform shapes. As another example, magnetizable granules may be flat metallic pieces, resembling flaps. In their testing, the present inventors found that flat metallic pieces would tend to change angles when charged, resulting in arching of the granules and thus contributing to the structural strengthening.

The present invention's packed bed of granules 110, within the shear-thickening fluid 120, exhibits significant inter-friction forces against slipping, and further exhibits formation of "arching" with adjoining granules 110, such as shown by granules 110 configured in arching directions L in FIG. 7. As illustrated in a conceptual way by bidirectional arrow S in FIG. 4, load is absorbed from internal friction from sliding of "interlocked" granules. The arching provides a "randomized" internal truss for the pressure-loaded shell. The shear-thickening fluid acts to restrain any catastrophic slippage between the granules that would lead to failure.

Generally, shear-thickening fluid increases in "viscosity" by many orders of magnitude under high-rate loading. A liquid armor may be capable of repulsing a knife or icepick thrust. The material referred to herein as shear-thickening fluid is usually nonmagnetic. Shear-thickening fluid represents one type of thickening fluid that is suitable for use in accordance with the present invention. For instance, a shear-thickening fluid suitable for inventive practice may be a colloid of silica nanoparticles suspended in polyethylene glycol.

Figure 11:
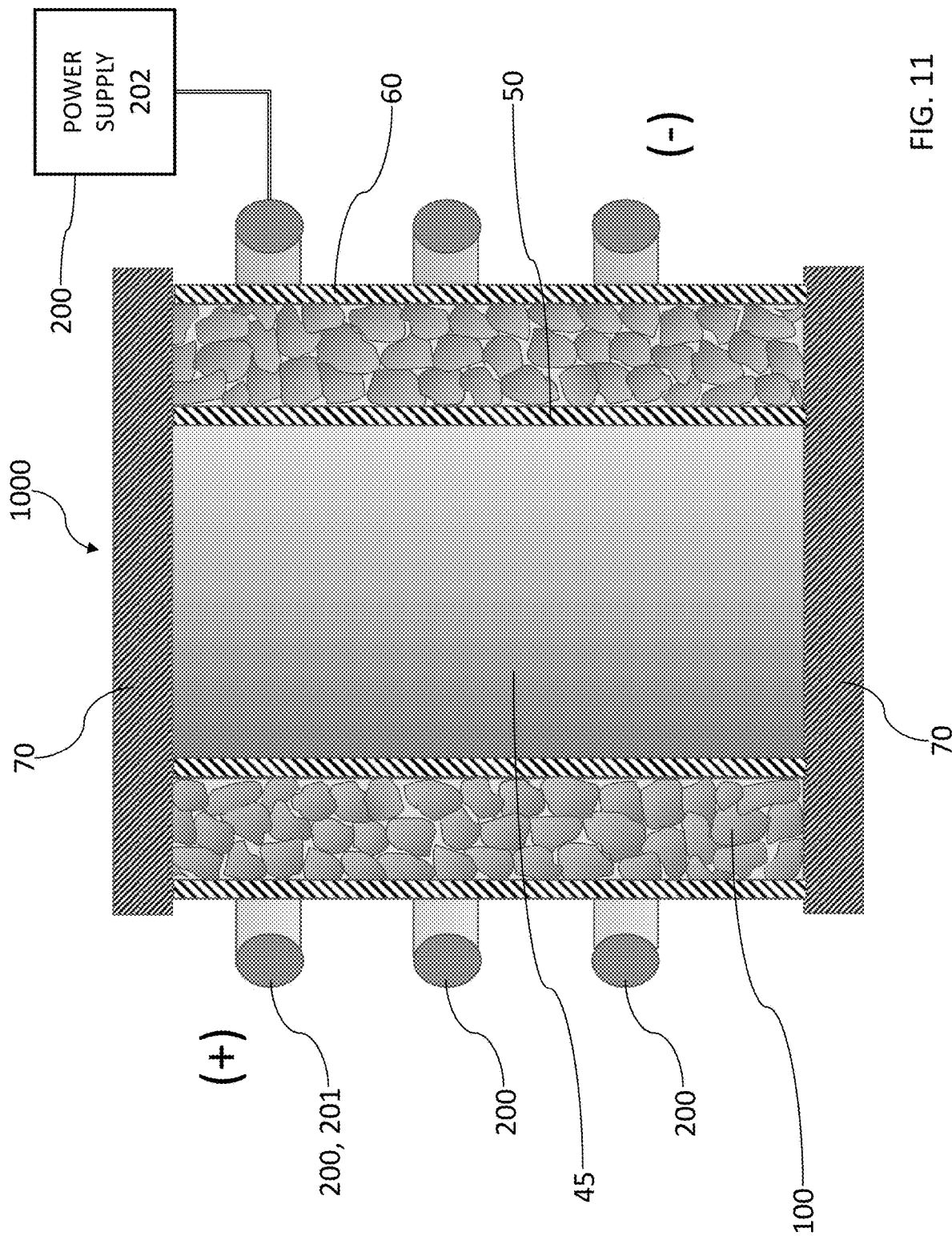
Figure 12:
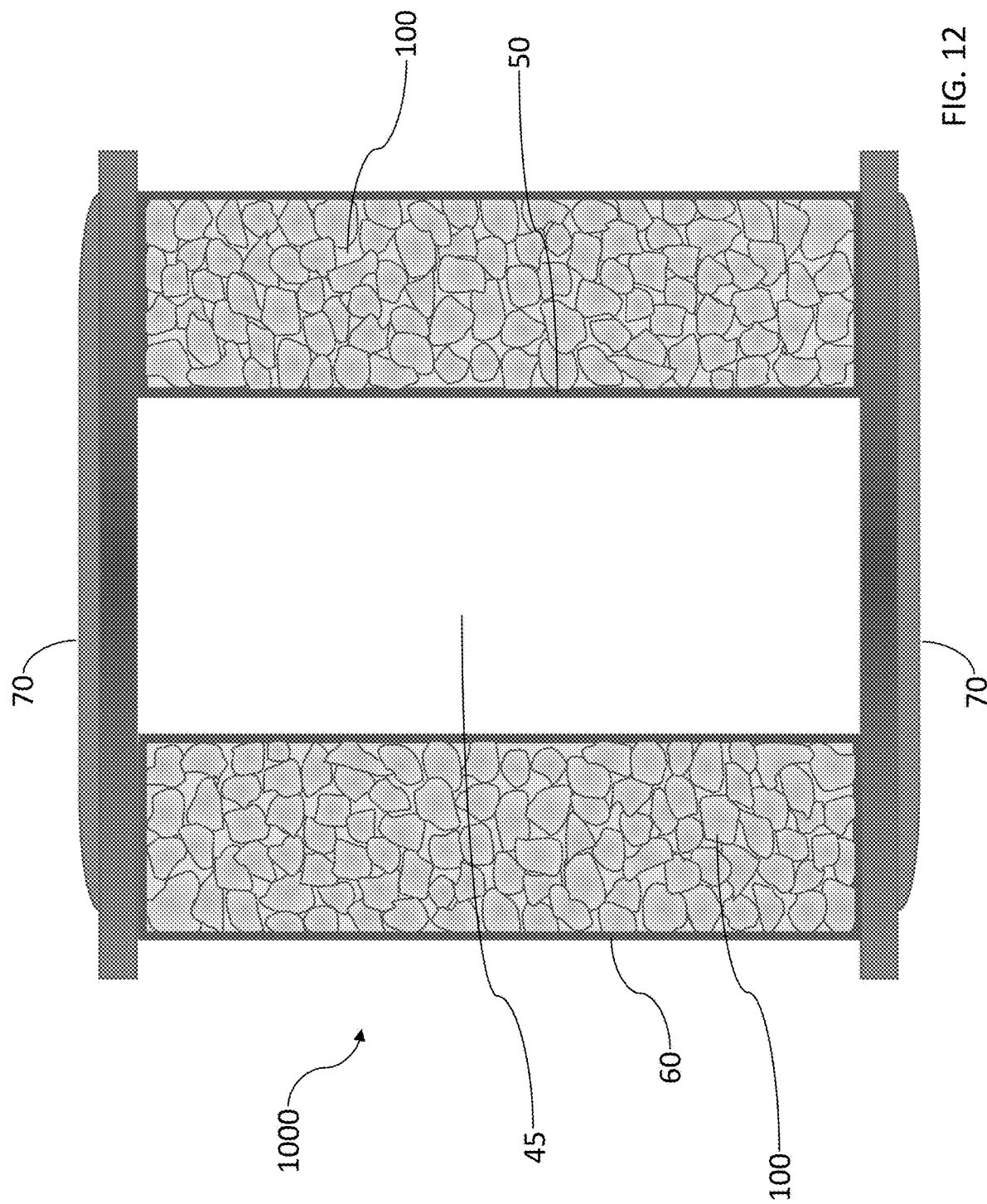
FIGS. 12 and 13 are each a cross-sectional side view, similar to the respective views of FIG. 4 and FIG. 9, of another embodiment of a structure in accordance with the present invention.
Figure 13:
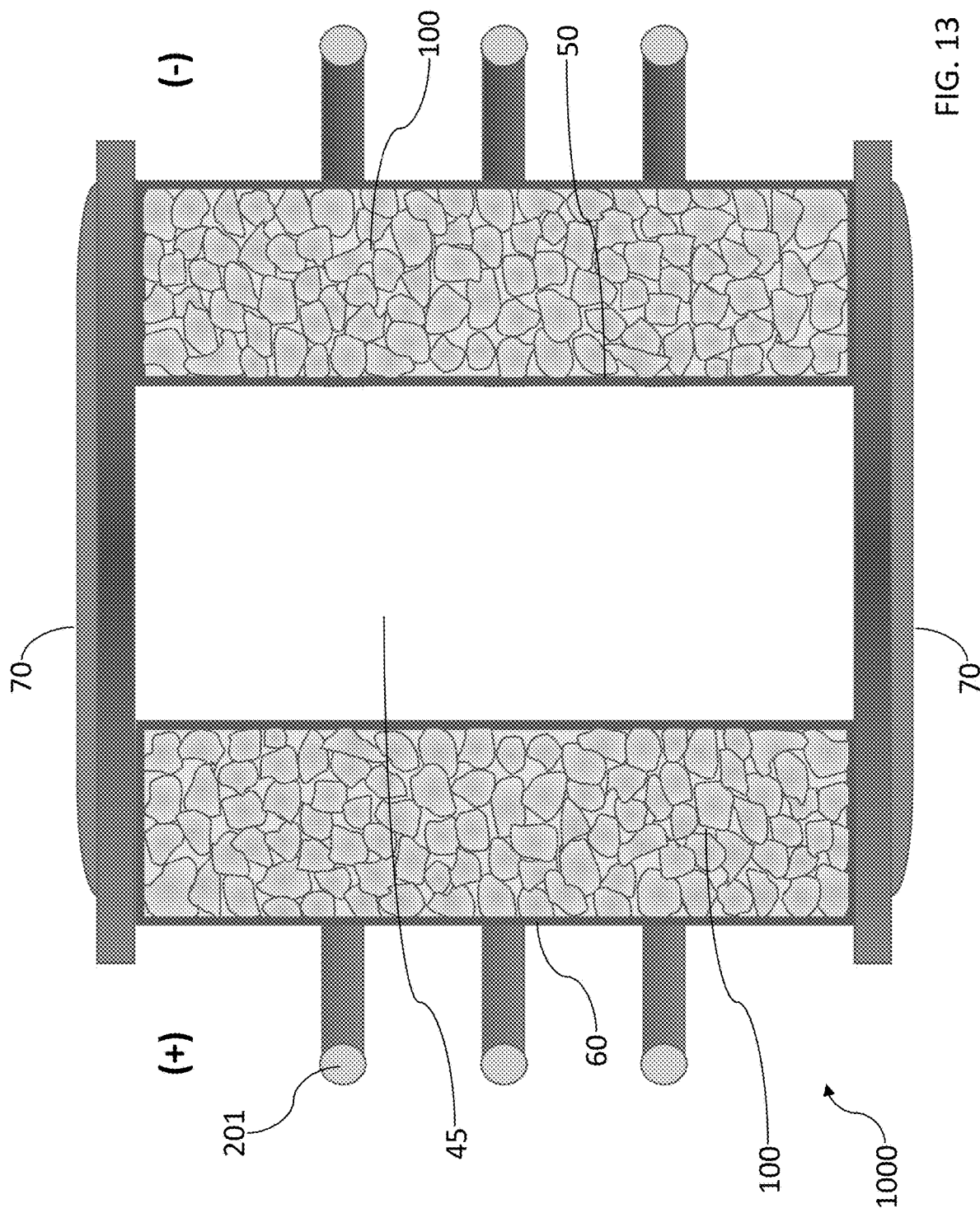

Another type of thickening fluid suitable for inventive practice is a magnetorheological fluid that thickens under a magnetic field. A typical magnetorheological fluid has tiny magnetic particles, such as spheroidal or ellipsoidal microparticles or nanoparticles, suspended in a carrier oil. For example, in inventive practice a magnetorheological fluid 120 may be used with ferrite granules 110, wherein the ferrite granules 110 are put into the core void 55 and are then infused with the magnetorheological fluid 120. The inventive assemblage can be exposed to a magnetizing field (e.g., on an ongoing basis), such as shown in FIGS. 11 and 13. This exposure to a magnetic field produces another level of cohesion (high magnetic attraction) between granules 110, in addition to the afore-noted cohesion associated with inter-friction and arching forces between the granules 110. In the light of the instant disclosure, the ordinarily skilled artisan will appreciate the various methods and devices that may be suitable for applying a magnetic field in practicing the present invention. For instance, FIG. 11 diagrammatically illustrates implementation of a magnetic field generating device 200 including a wire or coil 201 and a dc or ac power supply 202.

Generally speaking, many conventional pressure vessels are fabricated from monolithic materials such as steel, titanium, or carbon-reinforced plastic. The metal or alloy materials may require thick multi-pass welding, with significant residual stresses. In the case of carbon-reinforced plastic, there are significant safety factors and the possibility of three-dimension stiffening in stress concentration regions. In contrast, an exemplary inventive pressure vessel has two concentric cylinders that are formed by high strength materials that are suitable for or can take advantage of the thinner thickness dimensions of the cylinders. Such high-strength materials may include, inter alia, more highly strain-hardened materials, high-nitrogen stainless steels, or highly magnetic high-strength alloys.

According to exemplary inventive practice, two concentric high-strength-material cylindrical shell walls (50 and 60) are filled therebetween with granulated material 110. Liquid fluid 120 is infused into the interstices between granules 110. The remaining longitudinal-end edge of the inventive configuration is sealed using a low-temperature process such as laser or microwave welding. A completely made inventive structure 1000 is ready for practical application. With regard to inventive embodiments that include a magnetorheological fluid, either or both of the concentric shell walls 50 and 60 may be fabricated from a highly magnetizable material in order to increase internal "friction" forces between the shell and the granules.

As tabularly described by FIG. 17, according to a first mode of practice of the present invention, the matrix material 120 is a shear-thickening fluid. According to a second mode of practice of the present invention, the matrix material 120 is a magnetorheological fluid. According to a third mode of practice of the present invention, the matrix material 120 is an anti-magnetic rheological fluid. According to a fourth mode of practice of the present invention, the matrix material 120 is a highly rate-sensitive polymer. The term "highly rate-sensitive polymer" is synonymously referred to herein as a "strain-rate-sensitivity-hardening elastomer."

According to exemplary inventive embodiments the granules (whether magnetizable or non-magnetizable) may be described as macroparticles, as distinguished from microparticles or nanoparticles. By referring herein to the macroparticles as "granules," a clearer terminological distinction is drawn between the macroparticles and the nanoparticles/microparticles that are part of the matrix material.

According to exemplary embodiments of the first mode of practice of the present invention, concentric cylinders 50 and 60 are fabricated from high strength/modulus plating or sheeting. The concentric cylinders are sealed at the base by an end closure 70. The volume between the concentric cylinders is filled with granulated material 110, which is then infused with shear-thickening liquid (e.g., "liquid armor") 120. The inventive cylindrical configuration is then sealed at the top (e.g., via a closure 70) using low heat-input laser or microwave welding. Alternatively, the top can be sealed mechanically with a screw lid, for instance as in a common mason jar or similar container. When the inventive cylindrical configuration is pressurized, the dynamically strengthening granular core 100 forms arching paths of granules 110, which sustain the pressure as reinforcing "struts" and have a high resistance due to internal friction against sliding apart. As the point of dynamic failure is approached, the shear-thickening fluid (e.g., liquid armor) 120 provides strong dynamic resistance to the failure.

According to exemplary embodiments of the second mode of inventive practice, a "higher strength" version of an inventive structural device 1000 is provided. According to the second inventive mode, highly magnetizable (e.g., ferrite) granules 110 together with a magnetorheological fluid 120 provide magnified strength under magnetic fields. The magnetizable (e.g., ferrite) granules 110, in combination with the magnetorheological fluid 120, are then sealed and exposed to a strong magnetizing field, which magnetizes the ferrites and stiffens the fluid from the ferrites. Non-magnetized magnetizable granules are fit into the concentric cylindrical space between the two concentric cylinders. A magnetizing field is applied after the non-magnetized magnetizable granules are situated in the space. The magnetizing field may be applied prior to pressurization, or even during pressurization. According to some inventive embodiments, the cylindrical shells are also made of magnetizable material. In addition to arching and internal friction, the magnetized components of shell, granules, and magnetorheological fluid supply an extra level of cohesion against failure.

Vis-à-vis the first inventive mode, the second inventive mode substitutes magnetizable granules for the first inventive mode's non-magnetizable granules, and substitutes magnetorheological fluid for the first inventive mode's shear-thickening fluid. The dynamically strengthening material 100 thus includes magnetorheological fluid 120 and magnetizable granules 110 dispersed therein. Furthermore, the first inventive mode may be practiced with magnetizable (e.g., ferrite) granules as well as non-magnetizable granules; that is, a shear-thickening fluid may be used instead of a magnetorheological fluid, while still retaining the magnetizable (e.g., ferrite) granules. It should be noted however that, absent an actual application of a magnetic field at a suitable time to magnetize the granules, magnetizability as a property of the granules loses significance in the context of inventive practice.

First-mode inventive embodiments feature, inter alia, use of a shear-thickening fluid to extend pressure vessel strength under dynamic failure conditions. Second-mode inventive embodiments feature, inter alia, use of a magnetorheological fluid, wherein a magnetic field is applied to impose further cohesive strength to a mixture of granules and a magnetorheological fluid. The magnetization imposed via the magnetic field adds to the natural strengthening from the "arching" and internal friction of the granules. Implementation of a magnetic shell wall or walls further enhances this effect. Thinness of the shell material permits utilization of higher strength, higher modulus, and less weldable (or unweldable) materials in the shell fabrication.

A pressurized structure having a monolithic thick-walled construction may be expensive and difficult to fabricate. Exemplary inventive practice represents an efficacious and economical alternative for assembling pressurized structures, particularly in the lower length-to-diameter ratio (L/D) range of around 5 or less. Among the main ingredients of an exemplary inventive pressurized structure are a thin high-strength shell material, a granular material (either magnetizable or non-magnetizable), and a dynamically strengthening matrix material (shear-thickening fluid, or magnetorheological fluid, or highly rate-sensitive polymer, or anti-magnetic rheological fluid). An inventive structural device may thus be constituted from low-cost, readily available (e.g., off-the-shelf) materials.

Particularly with reference to FIG. 17, the four modes of inventive practice are distinguishable from each other in terms of, inter alia, the nature of the dynamically strengthening material 100—more specifically, the nature of the granular material 110 and of the matrix material 120. The first inventive mode uses a shear-thickening fluid and, depending on the inventive embodiment, either magnetizable or non-magnetizable granules. The second inventive mode uses a magnetorheological fluid and magnetizable granules. The third inventive mode uses an anti-magnetic rheological fluid and magnetizable granules. The fourth inventive mode uses a highly rate-sensitive polymer and, depending on the inventive embodiment, either magnetizable or non-magnetizable granules.

According to exemplary inventive practice, granules are dispersed or distributed (e.g., suspended) inside (i) a shear-thickening fluid, or (ii) a magnetorheological fluid, or (iii) an anti-magnetic rheological fluid, or (iv) a highly rate-sensitive polymer. According to exemplary second-mode inventive practice, magnetizable granules are dispersed in a magnetorheological fluid. The granules are attracted to the magnetic field, i.e., are paramagnetic and preferably ferromagnetic. The tiny ferromagnetic particles contained in the magnetorheological fluid are attracted to the magnetic field. A magnetic field is applied to help align the granules, such as indicated by arrows L in FIG. 7, in order to (further) stiffen the structure. In contrast, according to exemplary third-mode inventive practice, magnetizable granules are dispersed in an anti-magnetic rheological fluid. According to the third inventive mode, the granules are suspended inside an anti-magnetic rheological fluid, which is a diamagnetic particle-containing fluid such as a slurry of diamagnetic fluid material. The tiny diamagnetic particles contained in the anti-magnetic rheological fluid are repelled by the magnetic field.

According to exemplary practice of the third inventive mode, the magnetic field is used to move and align the ferromagnetic granules whereby diamagnetic fluid is pinned between the ferromagnetic granules. The situation of the diamagnetic fluid between the ferromagnetic granules creates a strong reinforcing field that increases the effective stiffness of the inventive structure. The magnetic field is temporarily applied. Once the magnetic field is removed, the positions of the ferromagnetic granules are locked because of the presence of the diamagnetic fluid between the ferromagnetic granules. This creates a strong reinforcing field that increases the effective stiffness of the structure. The magnetic field need only be applied once to lock in the positions and orientations of the granules in the desired magnetic field. In contrast, according to exemplary practice of the second inventive mode, a magnetic field is continuously applied in order to impart desired characteristics to the inventive structure; however, second-mode inventive practice can alternatively be embodied wherein a magnetic field is temporarily applied and then ceased to be applied in order to impart desired characteristics to the inventive structure. Similarly, third-mode inventive practice can alternatively be embodied wherein a magnetic field is applied on a continuous basis in order to impart desired characteristics to the inventive structure.

According to either the second inventive mode or the third inventive mode, the granules are attracted to the magnetic field, i.e., are paramagnetic and preferably ferromagnetic. Second-mode inventive practice and third-mode inventive practice implement two different material systems. The second inventive mode implements a magnetorheological fluid in conjunction with magnetizable (e.g., ferromagnetic) granules, which are dispersed in the magnetorheological fluid. The magnetorheological fluid is attracted by the magnetic field. The third inventive mode implements an anti-magnetic rheological fluid in conjunction with magnetizable (e.g., ferromagnetic) granules, which are dispersed in the anti-magnetic rheological fluid. The anti-magnetic rheological fluid is repelled by the magnetic field. The second inventive mode and the third inventive mode share a common goal, viz., to increase the stiffness of the structure.

Note the distinction between the magnetizable granules dispersed in exemplary inventive practice of either the magnetorheological fluid or the anti-magnetic rheological fluid, versus the non-magnetizable granules dispersed in exemplary inventive practice of the shear-thickening fluid. The magnetizable granules are preferably ferromagnetic and are magnetized in furtherance of magnetic interaction between the magnetizable granules and either the magnetorheological fluid (second-mode inventive practice) or the anti-magnetic rheological fluid (third-mode inventive practice). In contrast, the granules that interact with a shear-thickening fluid (first-mode inventive practice) are non-magnetizable granules (i.e., need not be magnetizable granules), since the physical interaction between the non-magnetizable granules and the shear-thickening fluid is non-magnetic in nature. On the other hand, according to second-mode exemplary inventive practice or third-mode exemplary inventive practice, the physical interaction between the magnetizable granules and the magnetorheological fluid or anti-magnetic rheological fluid is both magnetic and non-magnetic in nature.

Particularly with reference to FIGS. 8 and 11 through 13, exemplary practice of the third inventive mode features, inter alia, an exploitation of interaction between a magnetic granular material and a diamagnetic matrix material that are constituents of a core material, thereby providing a buckling-resistant inventive structure. The core is made up of small highly magnetizable granules (e.g., spheres, cylinders, ellipsoids, or irregular shapes) in a bed of a slurry of diamagnetic nanoparticles. According to exemplary inventive practice, the packing factor of the granules is between 50 and 85 percent.

An exemplary inventive structure is produced by combining a cylindrical vessel together with a dynamically strengthening granularly filled matrix core material 100, which is composed of magnetizable granules 110 dispersed in a slurry matrix 120 characterized by a carrier fluid 122 and diamagnetic nanoparticles 121 contained in the carrier fluid 122. A strong magnetic field is applied for magnetizing the granules 110, thereby "pinning" the granules and enhancing the strength of the pressure vessel. The diamagnetic nanoparticles thus assist in pinning the magnetized granules and increasing the stability of the core.

Diamagnetic materials, as opposed to paramagnetic materials (including ferromagnetic materials such as iron and ferrites), repel a magnetic field. The strongest diamagnetic chemical element is bismuth; however, a form of carbon, viz., pyrolytic graphite, is also strongly diamagnetic. Certain minerals such as quartz, glass, water, and calcite are weakly diamagnetic. Pyrolytic graphite exhibits covalent bonding between graphene sheets, and the diamagnetic features are along one principal axis. Photographic examples of magnetic levitation of pyrolytic graphite sheets over strong magnets may be found on the internet, e.g., on the Wikipedia webpage entitled "Pyrolytic Carbon." Diamagnetic pyrolytic carbon objects are shown, for instance, to stably magnetically levitate above a magnetic field emanating from a permanent magnet.

In inventive third-mode practice the magnetizable granules are packed, for example, within the boundaries of the two concentric cylinders that form the inner and outer boundaries of a cylindrical shell. An oil-based fluid matrix (e.g., slurry) containing nanoparticles (e.g., flakes) of diamagnetic material, preferably pyrolytic graphite, occupies the interstices between the granules. Pyrolytic graphite is also commercially available in highly flexible sheets, which according to some inventive embodiments may be used to line the insides or interior sides of the container cylinders, or be placed in internal locations, to produce inner rings of material.

The inventive concentric-cylinder unit is then sealed at the ends, and a strong magnetizing field is applied to it, thereby magnetizing the granular column of the core. The "interstitial" diamagnetic particles 121 in the core are repulsed away from the magnetic granules 110, such as indicated by arrows D in FIG. 8, thereby creating a strong reinforcing field that increase the effective stiffness of the inventive structure. The magnetic granules 110 are further constrained from sliding moments against each other and the walls of the concentric containment shell. The net effect is to create additional internal forces that further "pin" the packed magnetized granules, locking them in place.

Third-mode inventive practice thus features, inter alia, a novel use of diamagnetic capability to "pin" magnetic granules in place. The inventive combination of a diamagnetic particulate material and a magnetizable granular material allows for design of a wide range of pressure vessels. Inventive practice of combining magnetizable and diamagnetic components may also facilitate devising tuned structures to address certain vibratory frequency responses of the structures and/or change failure modes of the structures. Exemplary inventive construction of a structure requires no heat application.

In lieu of a shear-thickening fluid or a magnetorheological fluid or an anti-magnetic rheological fluid, a highly rate-sensitive polymer may be utilized. According to fourth-mode inventive practice, the dynamically strengthening material 100 is a granule-filled shear-thickening matrix material. It is preferred practice of the fourth mode of inventive practice that the granules be large enough to not introduce too high a viscosity in the production of the inventive structure. According to exemplary embodiments of the fourth inventive mode, a highly rate-sensitive polymer (such as a polyurea) is used, instead of a shear-thickening fluid, as the dynamically thickening fluid 120. Depending on the inventive embodiment, the highly rate-sensitive polymer 120 may be used with either magnetizable (e.g., ferrite) granules 110 or non-magnetizable granules 110. An exemplary embodiment of the fourth mode of inventive practice utilizes a strain-rate-sensitivity-hardening elastomer, which is a polymer from a class of polymers that exhibit highly rate-sensitive behavior, for instance over a wide range of velocities. Types of elastomers that may be suitable for inventive practice of a strain-rate-sensitivity-hardening elastomer include polyurea, polyurethane, or a combination (e.g., mixture) of polyurea and polyurethane.

The following United States patents, each of which is hereby incorporated herein by reference, are informative with regard to strain-rate-sensitivity-hardening elastomers and their physical properties: U.S. Pat. No. 9,869,533 B2 to Vanarsdalen et al. entitled "Blast and Ballistic Improvement in Helmets"; U.S. Pat. No. 8,580,387 B1 to Fedderly et al. entitled "Polyurea Composite Armor"; U.S. Pat. No. 7,946,211 B1 to Winchester et al. entitled "Electrical and Elastomeric Disruption of High-Velocity Projectiles"; U.S. Pat. No. 7,938,053 B1 to Dudt et al. entitled "Armor"; U.S. Pat. No. 7,794,808 B2 to Dudt et al. entitled "Elastomeric Damage-Control Barrier"; U.S. Pat. No. 7,300,893 B2 to Barsoum et al. entitled "Armor Including a Strain Rate Hardening Elastomer"; U.S. Pat. No. 7,114,764 B1 to Barsoum et al. entitled "Mine and Collision Protection for Passenger Vehicle."

Figure 15:
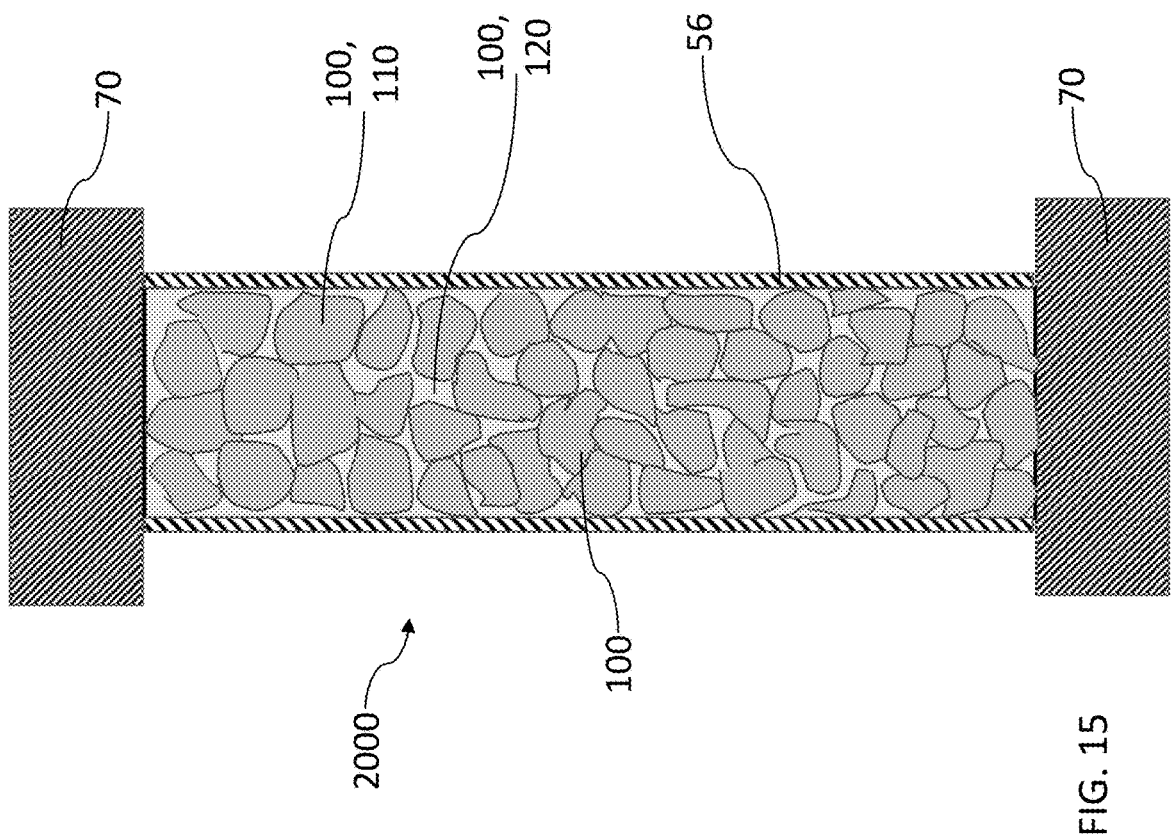
FIG. 15 is a cross-sectional side view of the inventive structure shown in FIG. 14.
Figure 14:
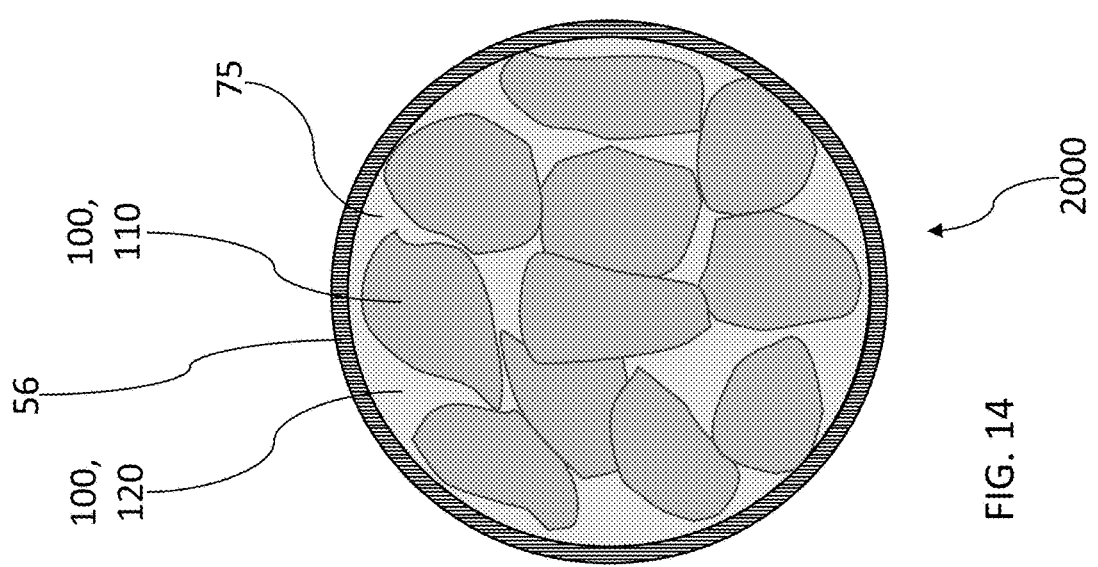
FIG. 14 is a cross-sectional end view of another embodiment of a structure in accordance with the present invention. The inventive structure shown in FIG. 14 has one cylindrical wall and a dynamically strengthening granulation-filled matrix material inside the cylindrical wall. The inventive granulation-filled matrix material includes a matrix and a number of granules dispersed in the matrix.

Now referring to FIGS. 14 through 16, an inventive pressure structure can be embodied in a cylindrical single-wall configuration, as distinguished from a concentric cylindrical double-wall configuration. For example, an inventive solid pillar 2000 can be fabricated by eliminating one of the cylinders (e.g., the inner cylinder), thus providing a high-strength single cylindrical wall 56 containing, in the cylindrical hollow 75, a dynamically strengthening material 100, which includes granules 110 and matrix 120. An inventive configuration of this kind may be used in construction or other structural applications, for instance as a constituent in a non-crack-forming "concrete." FIG. 16 shows, by way of example, three inventive construction beams or pillars 2000 mounted upon a foundation 80 and supporting a structure such as a plate or platform 90, a force or pressure P being exerted thereupon.

Figure 18:
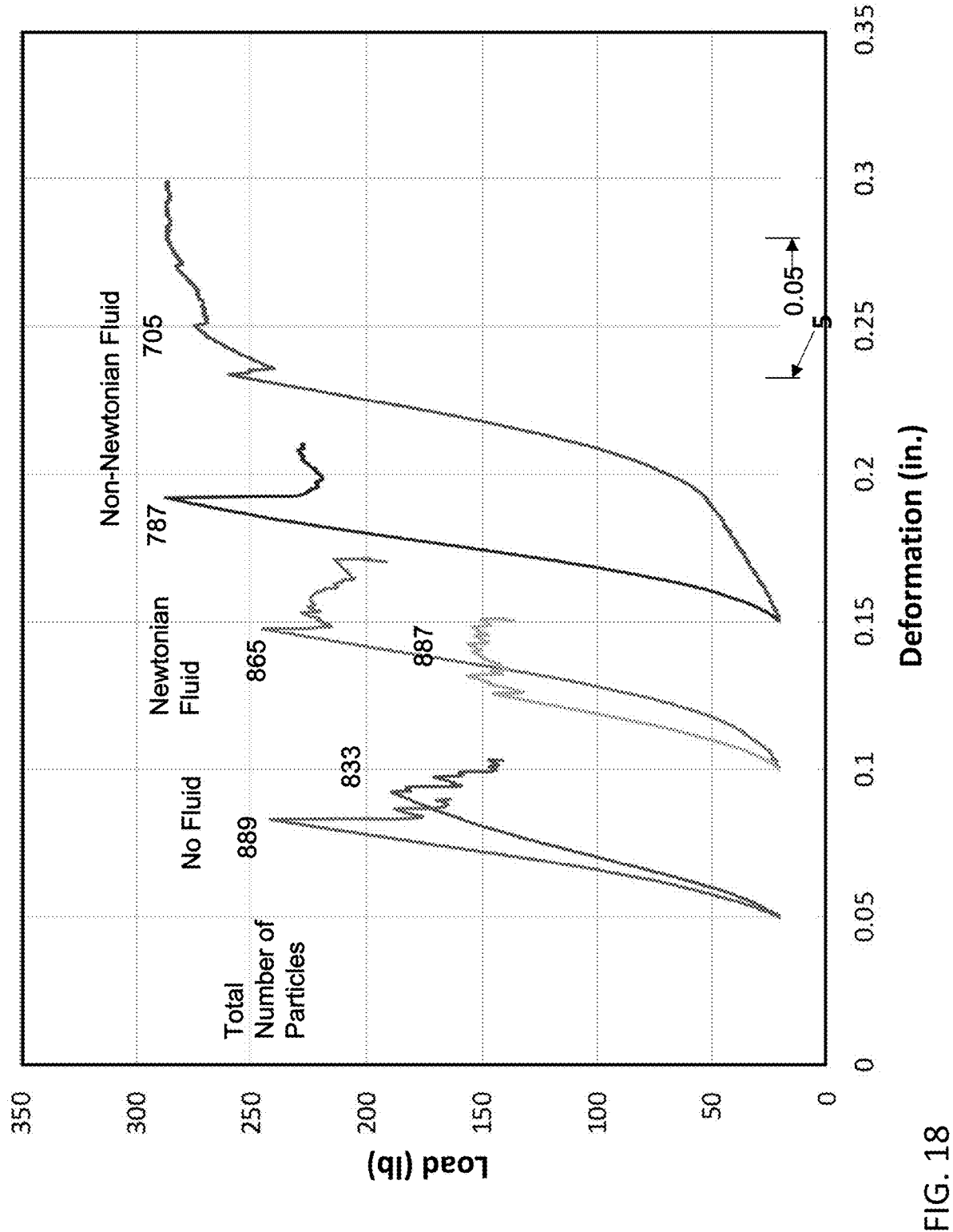
FIG. 18 is a graph showing, by way of example, load-deformation curves for 355-ml containers with and without fluid, in accordance with testing conducted by the present inventors.
Figure 20:
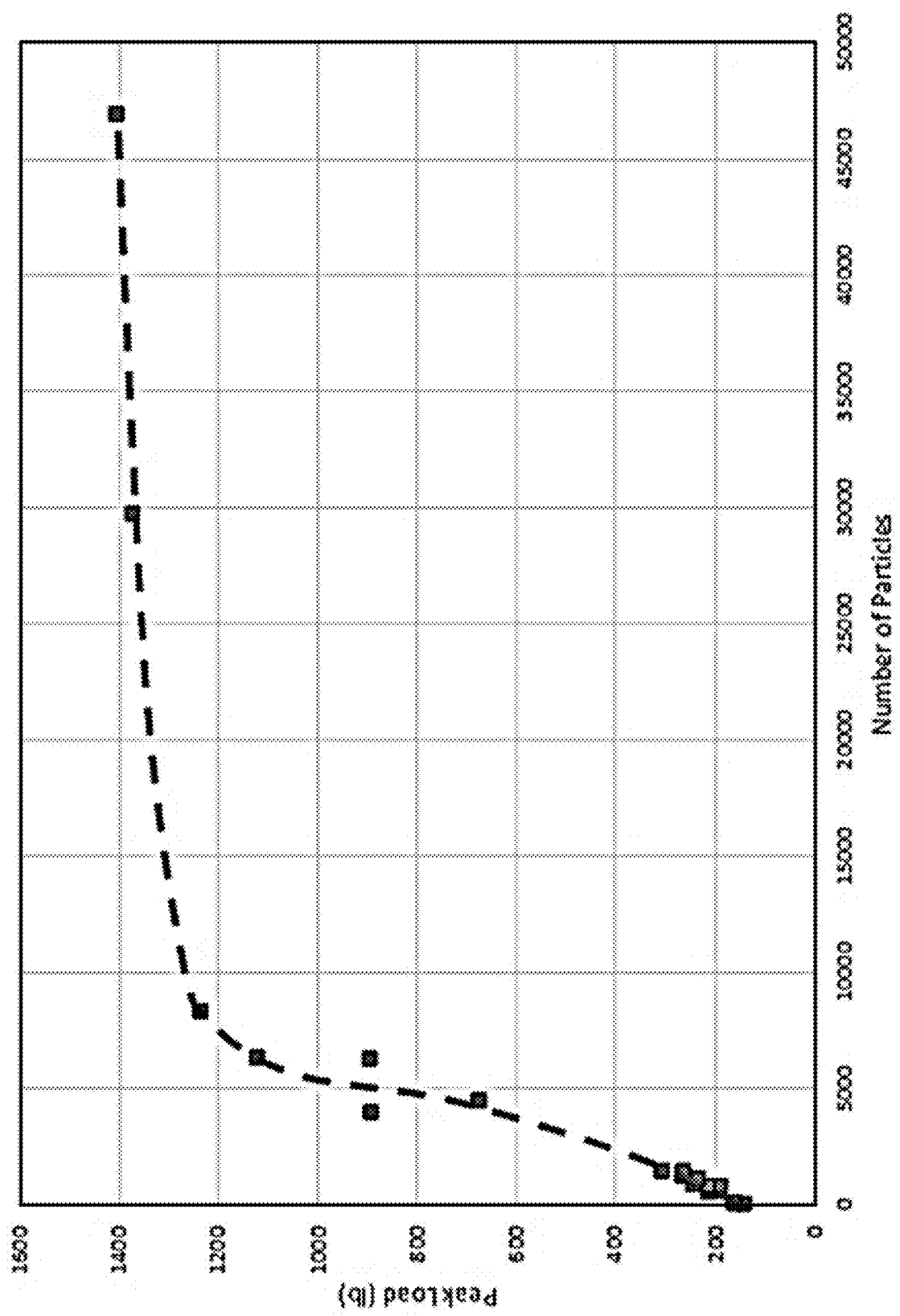
FIG. 20 is a graph showing, by way of example, expanded particle count test results, in accordance with testing conducted by the present inventors.

With reference to FIG. 18 and FIG. 20, the present inventors conducted tests involving different specimen types undergoing a uniaxial loading. Basically, the present inventors filled up several cylindrical containers with different particles and fluids, and observed how much load the present inventors could apply until each of the containers buckled. As an example of the types of specimens that were used, the specimens were (i) particles (pumice) only, (ii) particles and Newtonian fluid (water), and (iii) particles and non-Newtonian fluid (corn starch). Other combinations were used as a baseline to see differences in peak loading, for instance before and after particles were added to water.

As shown in FIG. 18, addition of the non-Newtonian fluid to the particles helped to increase the structural strength of the specimen. Each curve is characterized by a sharp peak and then a drop-off, which represents structural failure, i.e., buckling of the container. The two curves on the right-hand side (the specimens with the particles and non-Newtonian fluid added) had a higher peak load capacity than the four curves to the left (wherein two curves are particles with no fluid, and two curves are particles with a Newtonian fluid). The respective numbers above the curves are the number of particles that were in each container. Considering the number of particles pertaining to each curve, the present inventors determined that the combination of particles and non-Newtonian fluids was significantly better in terms of increased load capacity with fewer numbers of particles.

Figure 19:
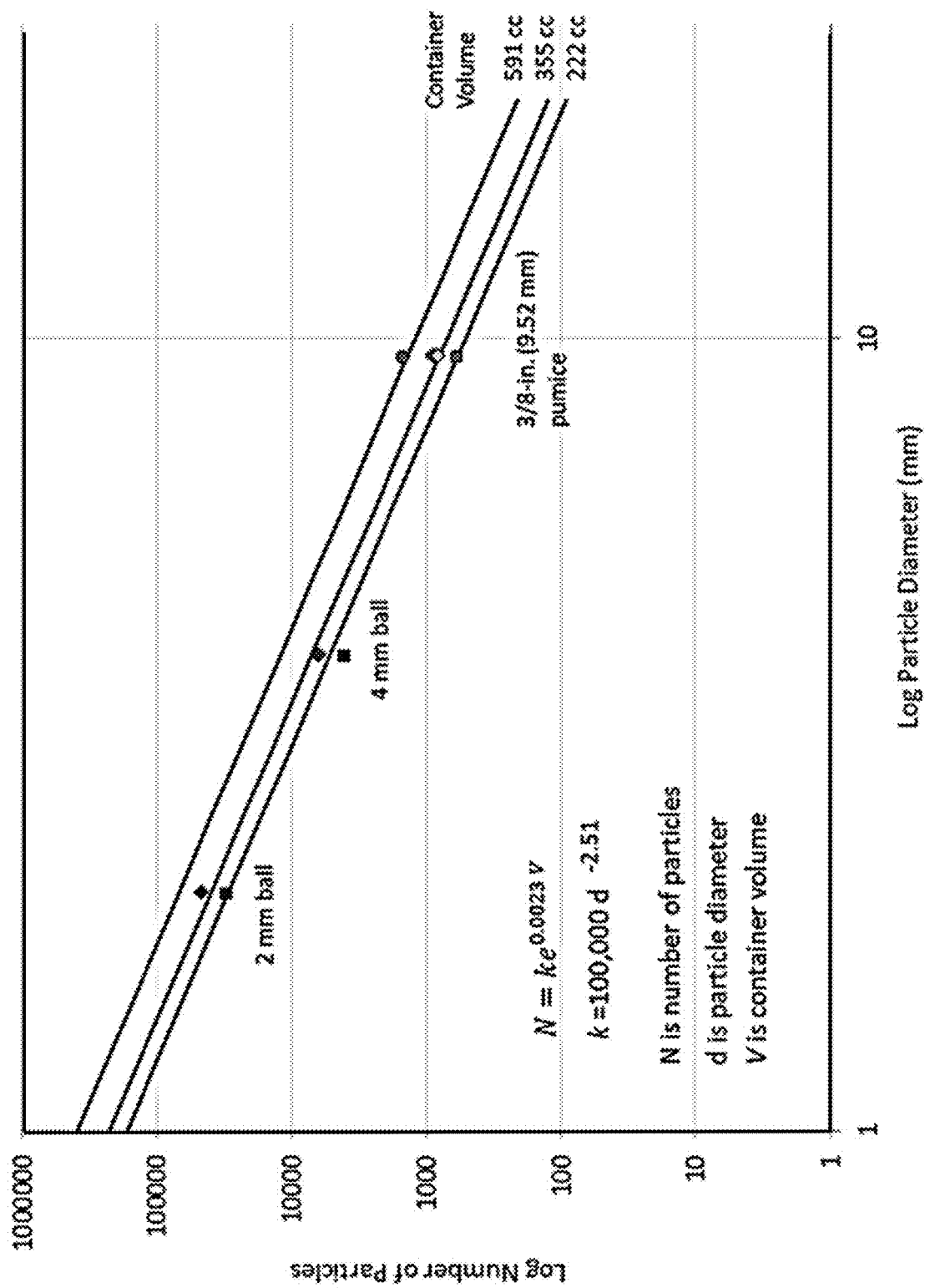
FIG. 19 is a graph showing, by way of example, numbers of particles that can be packed in a given container volume as a function of particle diameter, in accordance with testing conducted by the present inventors.

FIG. 20 shows that as the number of particles increases, the peak load capacity of the specimen increases as well. Note that, although FIG. 20 does not reflect that the particles used were of different types and sizes, the present inventors believe that number of particles is the more relevant parameter as compared with the types and sizes of the particles. FIG. 19 is illustrative of the present inventors' investigation as to how many particles with a given particle diameter can fit into a given container volume.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A structure comprising an axisymmetric body and a granularly filled matrix material, said axisymmetric body characterized by an interior space, said granularly filled matrix material confined in said interior space and including a magnetorheological fluid and a plurality of flat magnetizable macroparticulate granules dispersed in said magnetorheological fluid, said magnetorheological fluid including a carrier fluid and a plurality of magnetizable tiny particles contained in said carrier fluid, said magnetizable tiny particles selected from the group consisting of spheroidal magnetizable microparticles, ellipsoidal magnetizable microparticles, spheroidal magnetizable nanoparticles, and ellipsoidal magnetizable nanoparticles, wherein while a magnetic field is applied to said granularly filled matrix material said magnetorheological fluid thickens, at least some said flat magnetizable macroparticulate granules frictionally interact, at least some said flat magnetizable macroparticulate granules configuratively interact, and at least some said flat magnetizable macroparticulate granules are magnetically attracted to each other, said applied magnetic field thereby strengthening said structure as compared with said structure in the absence of said applied magnetic field, wherein said strengthening of said structure is associated with a magnetic attraction by said magnetic field of at least some said flat magnetizable macroparticulate granules and at least some said magnetizable tiny particles, wherein said configurative interaction among some said flat magnetizable macroparticulate granules includes arching forces between at least some said flat magnetizable macroparticulate granules, and wherein said arching forces are associated with a tendency of said flat magnetizable macroparticulate granules to change angles in the presence of said applied magnetic field.

2. The structure of claim 1 wherein at least a portion of said axisymmetric body is paramagnetic, at least some said flat magnetizable macroparticulate granules are ferromagnetic, and wherein while said magnetic field is applied to said granularly filled matrix material and to said axisymmetric body at least some said flat magnetizable macroparticulate granules are magnetically attracted to said at least a portion of said axisymmetric body.

3. A structure comprising an axisymmetric body and a granularly filled matrix material, said axisymmetric body characterized by an interior space, said granularly filled matrix material confined in said interior space and including an anti-magnetic rheological fluid and a plurality of magnetizable macroparticulate granules dispersed in said anti-magnetic rheological fluid, said anti-magnetic rheological fluid being a rheological fluid including a carrier fluid and a plurality of diamagnetic tiny particles contained in said carrier fluid, each said diamagnetic tiny particle characterized by being strongly magnetically repelled by a magnetic field, said diamagnetic tiny particles selected from the group consisting of pyrolytic graphite microparticles, bismuth microparticles, pyrolytic graphite nanoparticles, and bismuth nanoparticles, wherein said structure has been strengthened by a temporary application of a magnetic field, wherein said strengthening of said structure is characterized by an interlocking among at least some said magnetizable macroparticulate granules, wherein said strengthening of said structure is associated with a magnetic attraction by said magnetic field of at least some said magnetizable macroparticulate granules, and wherein said strengthening of said structure is further associated with a magnetic repelling by said magnetic field of at least some said diamagnetic tiny particles.

4. The structure of claim 3 wherein at least a portion of said axisymmetric body is ferromagnetic, at least some said magnetizable macroparticulate granules are ferromagnetic, and wherein said interlocking is further associated with a magnetic attraction by said magnetic field of said at least a portion of said axisymmetric body.

5. An apparatus comprising a structure including two hollow cylinders and a granularly filled matrix material, said two hollow cylinders being characterized by different diameters and being coaxially situated so as to define an annular cylindrical space therebetween, said granularly filled matrix material at least substantially occupying said annular cylindrical space and including a magnetorheological fluid and a plurality of flat magnetizable macroparticulate granules dispersed in said magnetorheological fluid, said magnetorheological fluid including a carrier fluid and a plurality of magnetizable tiny particles contained in said carrier fluid, said magnetizable tiny particles selected from the group consisting of spheroidal magnetizable microparticles, ellipsoidal magnetizable microparticles, spheroidal magnetizable nanoparticles, and ellipsoidal magnetizable nanoparticles, wherein when a magnetic field is applied with respect to said granularly filled matrix material at least some said flat magnetizable macroparticulate granules are magnetized, at least some said flat magnetizable tiny particles are magnetized, said magnetorheological fluid increases in viscosity, arching forces manifest between at least some said flat magnetizable macroparticulate granules, said arching forces are associated with a tendency of said flat magnetizable macroparticulate granules to change angles in the presence of said applied magnetic field, and said structure is strengthened.

6. The apparatus of claim 5 further comprising a device for sustainably applying said magnetic field, wherein said structure is strengthened while said magnetic field is sustainably applied.

7. The apparatus of claim 5 wherein during subjection of said structure to pressure loading said strengthening of said structure increases resistance of said structure to said pressure loading.

8. The apparatus of claim 5 wherein said two hollow cylinders are an inner said hollow cylinder and an outer said hollow cylinder, said inner hollow cylinder has an outside cylindrical surface, said outer hollow cylinder has an inside cylindrical surface, and said annular cylindrical space is bounded by said outside cylindrical surface and said inside cylindrical surface.

9. The apparatus of claim 5 wherein said structure is characterized by a geometric longitudinal axis and two axial-longitudinal ends, and wherein said structure further comprises two end-closures respectively situated at said two axial-longitudinal ends.

10. The apparatus of claim 5 wherein when said magnetic field is applied inter-granular forces occur between at least some said flat magnetizable macroparticulate granules, said inter-granular forces including at least one of:
increased frictional forces concomitant said increased viscosity of said matrix;
increased said arching forces concomitant said increased viscosity of said matrix;
alignment forces concomitant a magnetic attraction between at least some said flat magnetizable macroparticulate granules.

11. The apparatus of claim 5 wherein an interactive change between at least some said flat magnetizable macroparticulate granules is associated with said application of said magnetic field, said interactive change being characterized by at least one of:
viscosity-induced frictional forces between at least some said flat magnetizable macroparticulate granules;
viscosity-induced said arching forces between at least some said flat magnetizable macroparticulate granules;

magnetic attraction-induced alignment forces between at least some said magnetizable macroparticulate granules.

12. The apparatus of claim 5 wherein an interactive change between at least some said flat magnetizable macroparticulate granules is associated with said application of said magnetic field, said interactive change being characterized by:
viscosity-induced frictional forces between at least some said flat magnetizable macroparticulate granules;
viscosity-induced said arching forces between at least some said flat magnetizable macroparticulate granules;
magnetic attraction-induced alignment forces between at least some said magnetizable macroparticulate granules.

13. The apparatus of claim 12 wherein:
at least one said hollow cylinder is a magnetizable hollow cylinder;
when said magnetic field is applied at least one said magnetizable hollow cylinder is magnetized;
said interactive change is further characterized by magnetic attraction-induced alignment forces between said at least one hollow cylinder and at least some said flat magnetizable macroparticulate granules.

14. An apparatus comprising a structure including two hollow cylinders and a granularly filled matrix material, said two hollow cylinders being characterized by different diameters and being coaxially situated so as to define an annular cylindrical space therebetween, said granularly filled matrix material at least substantially occupying said annular cylindrical space and including an anti-magnetic rheological fluid and a plurality of magnetizable macroparticulate granules dispersed in said anti-magnetic rheological fluid, said anti-magnetic rheological fluid being a rheological fluid including a carrier fluid and a plurality of diamagnetic tiny particles contained in said carrier fluid, each said diamagnetic tiny particle characterized by being strongly magnetically repelled by a magnetic field, said diamagnetic tiny particles selected from the group consisting of pyrolytic graphite microparticles, bismuth microparticles, pyrolytic graphite nanoparticles, and bismuth nanoparticles, wherein at least some said magnetizable macroparticulate granules have been rendered in an interlocked condition as a result of an application of a magnetic field, wherein said interlocked condition of said at least some said magnetizable macroparticulate granules is associated with a magnetic repulsion of said diamagnetic tiny particles by said magnetic field, wherein said interlocked condition of said at least some said magnetizable macroparticulate granules is further associated with a magnetic attraction of said magnetizable macroparticulate granules by said magnetic field, and wherein said interlocked condition of said at least some said magnetizable macroparticulate granules is further associated with a magnetic interaction between said diamagnetic tiny particles and said magnetizable macroparticulate granules.

15. The apparatus of claim 14 wherein said structure has been strengthened by a temporary said application of said magnetic field, and wherein during subjection of said structure to pressure loading said strengthening of said structure increases resistance of said structure to said pressure loading.

16. The apparatus of claim 14 wherein:
said two hollow cylinders are an inner said hollow cylinder and an outer said hollow cylinder; said inner hollow cylinder has an outside cylindrical surface;
said outer hollow cylinder has an inside cylindrical surface;
said annular cylindrical space is bounded by said outside cylindrical surface and said inside cylindrical surface;
said structure is characterized by a geometric longitudinal axis and two axial-longitudinal ends;
said structure further comprises two end-closures respectively situated at said two axial-longitudinal ends.

17. The apparatus of claim 14 wherein said interlocked condition of said at least some said magnetizable macroparticulate granules is characterized by at least one of:
alignment between at least some said magnetizable macroparticulate granules, said alignment having been brought about by said magnetic attraction;
pinning of at least some said magnetizable macroparticulate granules by at least some said diamagnetic tiny particles, said pinning having been brought about by said magnetic interaction.

18. The apparatus of claim 14 wherein said interlocked condition of said at least some said magnetizable macroparticulate granules is characterized by:
alignment between at least some said magnetizable macroparticulate granules, said alignment having been brought about by said magnetic attraction;
pinning of at least some said magnetizable macroparticulate granules by at least some said diamagnetic particles, said pinning having been brought about by said magnetic interaction.

19. The apparatus of claim 18 wherein at least one said magnetizable hollow cylinder is a magnetized hollow cylinder, and wherein said interlocked condition of said at least some said magnetizable macroparticulate granules is further characterized by a magnetic attraction between said at least one magnetized hollow cylinder and at least some said magnetizable macroparticulate granules.

20. The structure of claim 3 wherein said diamagnetic tiny particles are selected from the group consisting of pyrolytic graphite microparticles and pyrolytic graphite nanoparticles.

21. The structure of claim 3 wherein said diamagnetic tiny particles are selected from the group consisting of bismuth microparticles and bismuth nanoparticles.

22. The apparatus of claim 14 wherein said diamagnetic tiny particles are selected from the group consisting of pyrolytic graphite microparticles and pyrolytic graphite nanoparticles.

23. The apparatus of claim 14 wherein said diamagnetic tiny particles are selected from the group consisting of bismuth microparticles and bismuth nanoparticles.

* * * * *